(12) United States Patent
Ueda et al.

(10) Patent No.: US 7,406,253 B2
(45) Date of Patent: Jul. 29, 2008

(54) PICKED UP IMAGE RECORDING SYSTEM, SIGNAL RECORDING DEVICE, AND SIGNAL RECORDING METHOD

(75) Inventors: Yoshihito Ueda, Kanagawa (JP); Hiromi Hoshino, Kanagawa (JP); Tomokiyo Kato, Kanagawa (JP); Kaoru Urata, Kanagawa (JP); Mikio Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 678 days.

(21) Appl. No.: 10/509,808

(22) PCT Filed: Apr. 3, 2003

(86) PCT No.: PCT/JP03/04280

§ 371 (c)(1),
(2), (4) Date: Sep. 30, 2004

(87) PCT Pub. No.: WO03/085969

PCT Pub. Date: Oct. 16, 2003

(65) Prior Publication Data

US 2005/0163492 A1 Jul. 28, 2005

(30) Foreign Application Priority Data

Apr. 4, 2002 (JP) ............................. 2002-103018

(51) Int. Cl.
*H04N 5/225* (2006.01)
(52) U.S. Cl. .................... 386/107; 386/46; 386/95; 386/117; 348/220.1

(58) Field of Classification Search ............... 386/46, 386/107, 117; 348/220, 231.2, 231.3, 231.7, 348/333.02, 220.1, 221.1, 231.1, 362–367
See application file for complete search history.

(56) References Cited

U.S. PATENT DOCUMENTS 4,472,803 A * 9/1984 Iijima ..................... 370/522

(Continued)

FOREIGN PATENT DOCUMENTS

JP 4-177985 6/1992

(Continued)

*Primary Examiner*—Thai Tran
*Assistant Examiner*—Mishawn Dunn
(74) *Attorney, Agent, or Firm*—Frommer Lawrence & Haug LLP; William S. Frommer; Thomas F. Presson

(57) ABSTRACT

When a recording start executed in a variable-speed recording mode, at ST44 a signal having a variable frame rate is selected on the basis of a validity signal from among image signals having a predetermined output frame rate in which the images having the variable frame rate are contained and stored in a memory. If it is decided at ST46 that a phase difference between a write position and a read position in the memory has reached a recording start level, the stored signal is recorded in a recording medium at ST47. If it is decided at ST48 that the phase difference has decreased to a recording stop level, recording to the recording medium is stopped at ST49. When an end operation is executed at ST51, the signal in the memory is recorded in the recording medium to then end actions. The signals are selected and recorded, thus resulting in a smaller signal quantity. Further, if the variable frame rate is varied, video effects can be confirmed only by reproducing the recorded signals.

13 Claims, 20 Drawing Sheets

U.S. PATENT DOCUMENTS

2003/0107657 A1* 6/2003 Shioji et al. .............. 348/220.1
2004/0081437 A1* 4/2004 Asada et al. ................ 386/131

FOREIGN PATENT DOCUMENTS

| | | |
|---|---|---|
| JP | 10-23318 | 1/1998 |
| JP | 11-177930 | 7/1999 |
| JP | 2000-125210 | 4/2000 |
| JP | 2001-298693 | 10/2001 |
| JP | 2002-320203 | 10/2002 |

* cited by examiner

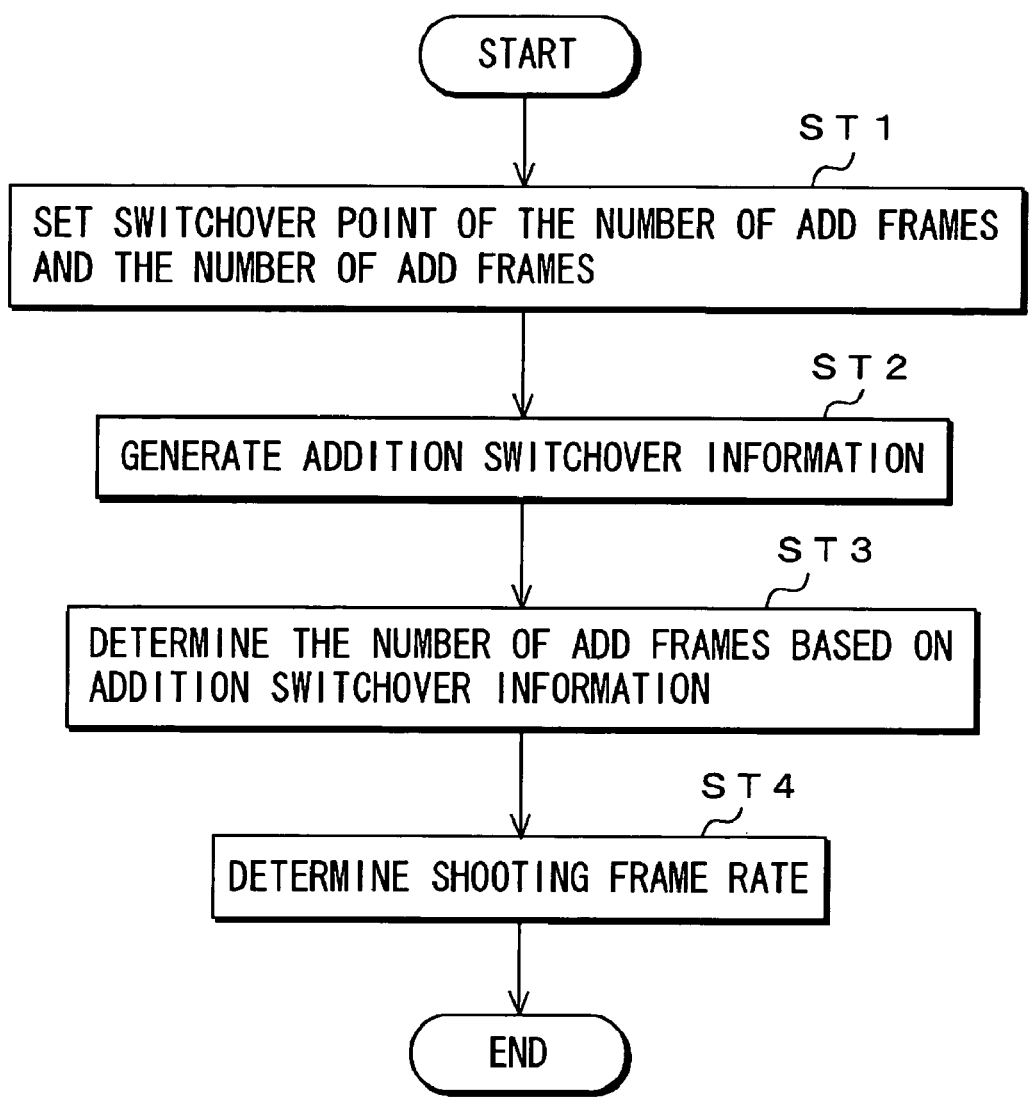

F I G. 5

| ADDITION SWITCHOVER INFORMATION | | SHOOTING FRAME RATE $FRp = FRc \times FAD$ |
|---|---|---|
| VARIABLE FRAME RATE FRc | NUMBER OF ADD FRAMES FAD | |
| $60P \geqq FRc > 30P$ | 1 | $60P \geqq FRp > 30P$ |
| $30P \geqq FRc > 20P$ | 2 | $60P \geqq FRp > 40P$ |
| $20P \geqq FRc > 15P$ | 3 | $60P \geqq FRp > 45P$ |
| $15P \geqq FRc > 12P$ | 4 | $60P \geqq FRp > 48P$ |
| $12P \geqq FRc > 10P$ | 5 | $60P \geqq FRp > 50P$ |
| $10P \geqq FRc > 6P$ | 6 | $60P \geqq FRp > 36P$ |
| $6P \geqq FRc > 5P$ | 10 | $60P \geqq FRp > 50P$ |
| $5P \geqq FRc > 4P$ | 12 | $60P \geqq FRp > 48P$ |
| $4P \geqq FRc > 3P$ | 15 | $60P \geqq FRp > 45P$ |
| $3P \geqq FRc > 2P$ | 20 | $60P \geqq FRp > 40P$ |
| $2P \geqq FRc > 1P$ | 30 | $60P \geqq FRp > 30P$ |
| 1P | 60 | 60P |

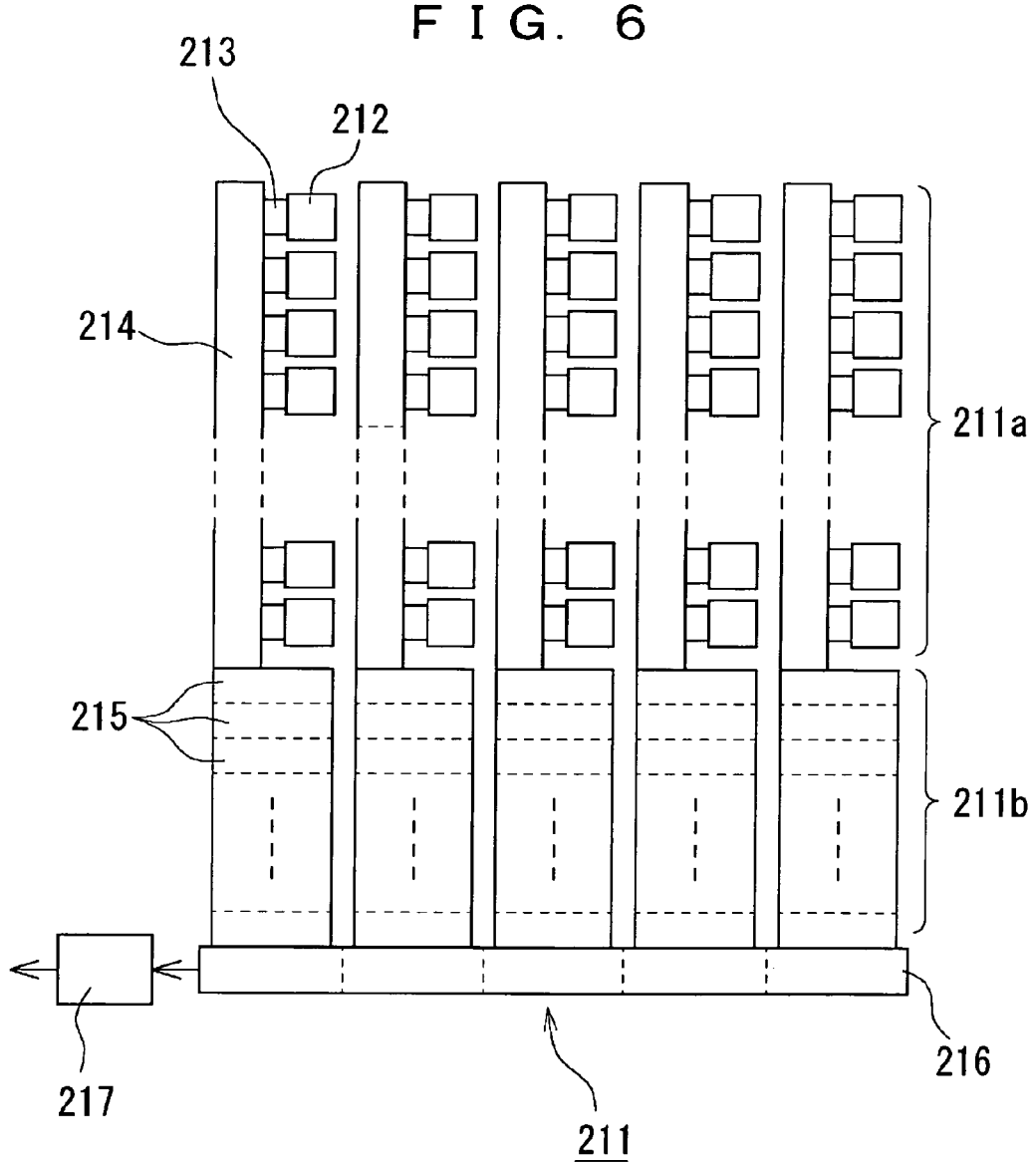
F I G. 6

FIG. 12A (Dvb) 54P | 0f | 1f | 2f | 3f | 4f | 5f | 6f | 7f | 8f | 9f | 10f |

FIG. 12B (RAM 304-1) | 0f | READ | | 3f | READ | | 6f | READ | | 9f | READ |

FIG. 12C (RAM 304-2) | 0f+1f | READ | 3f+4f | READ | 6f+7f | READ | 9f+10f |

FIG. 12D (RAM 304-3) | 0f+1f+2f | READ | 3f+4f+5f | READ | 6f+7f+8f | READ |

FIG. 12E (EXTERNAL READABILITY FLAG): OFF → ON at t4

FIG. 12F (DVj) 60P (18P): BLANK FRAME | (0f+1f+2f)/3 | (3f+4f+5f)/3 | (6f+7f+8f)/3 |

FIG. 12G (Tv): VAILD | VAILD | INVAILD | VAILD | INVAILD | VAILD | INVAILD t1 t2 t3 t4 t5 t6 t7

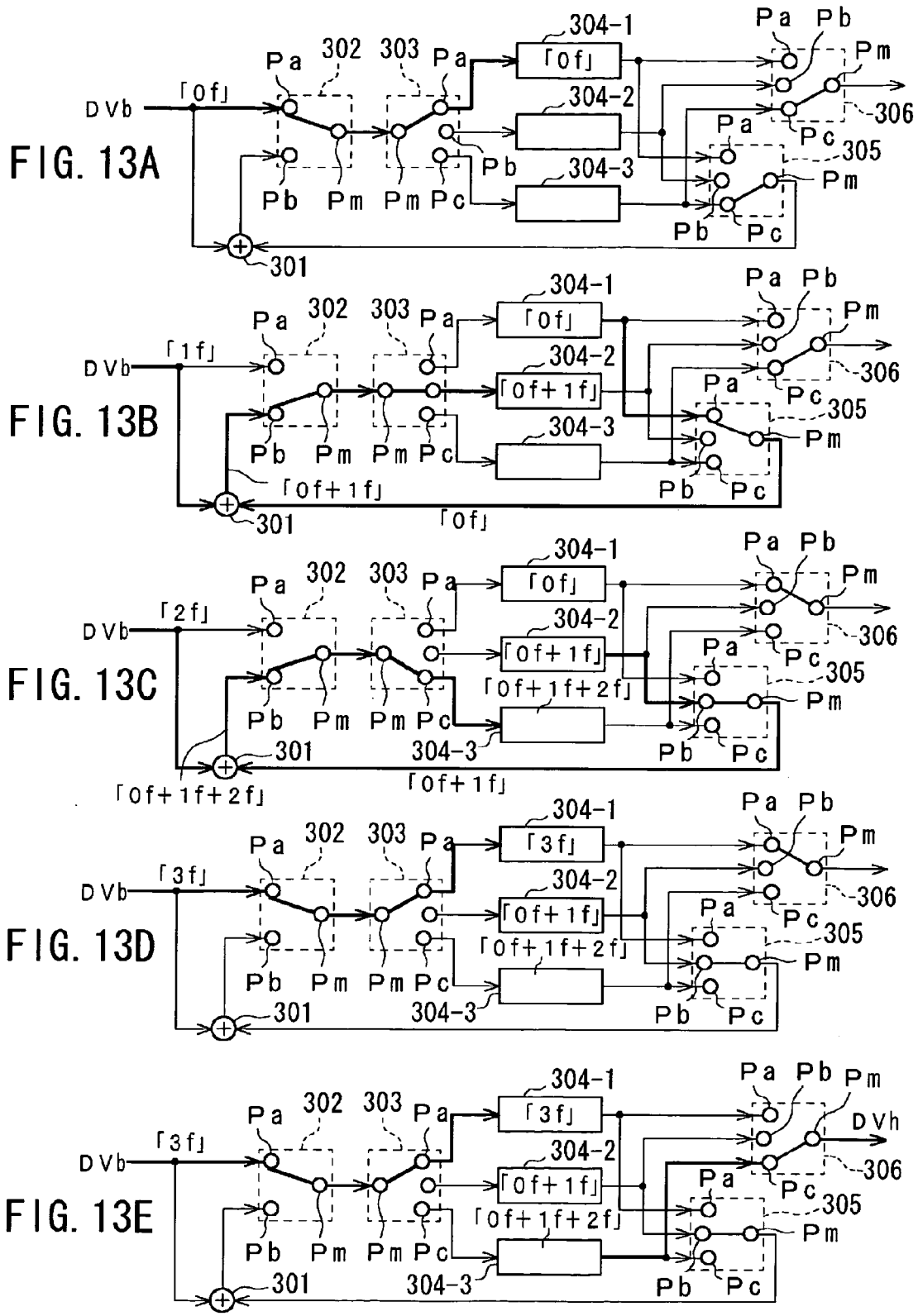

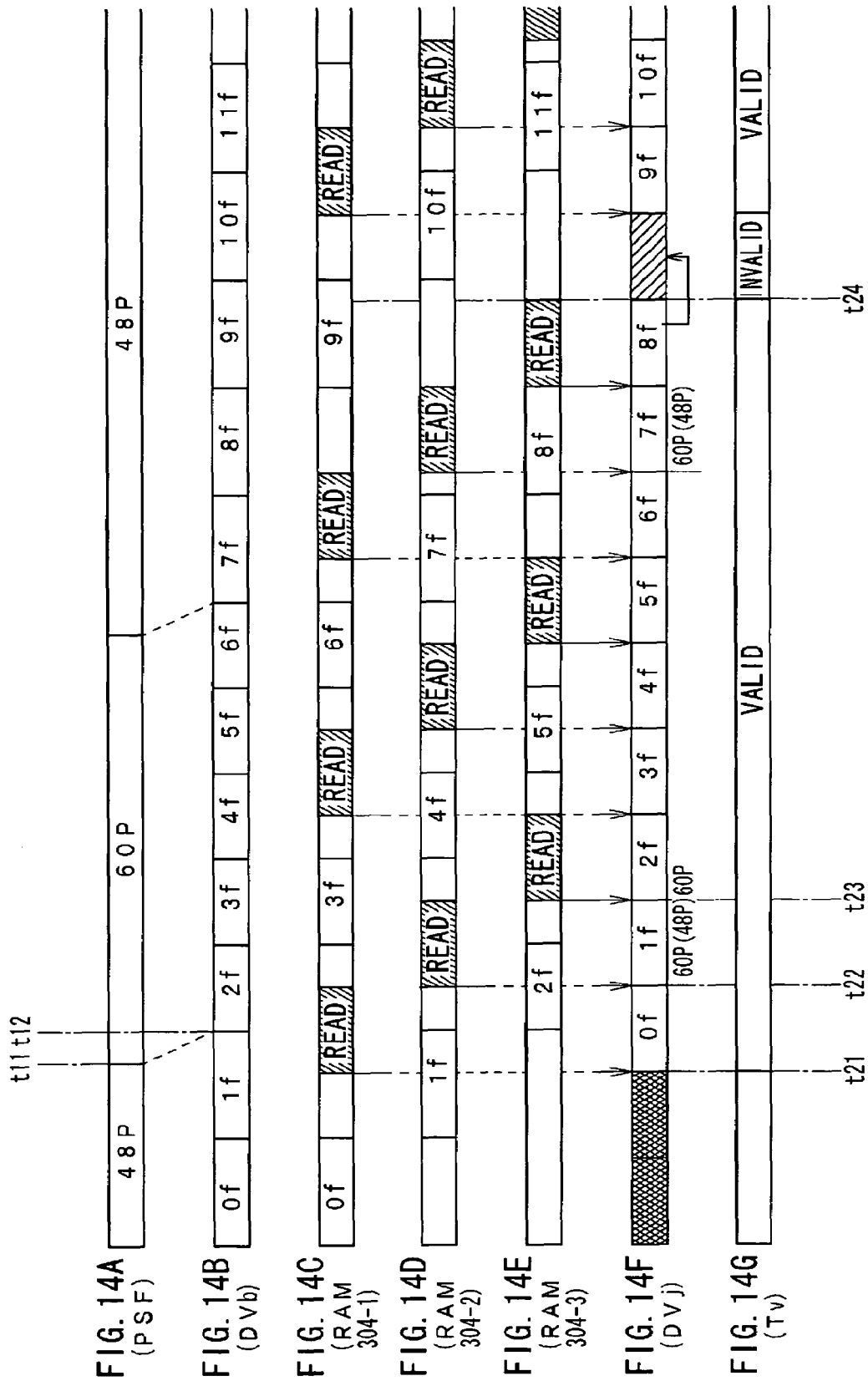

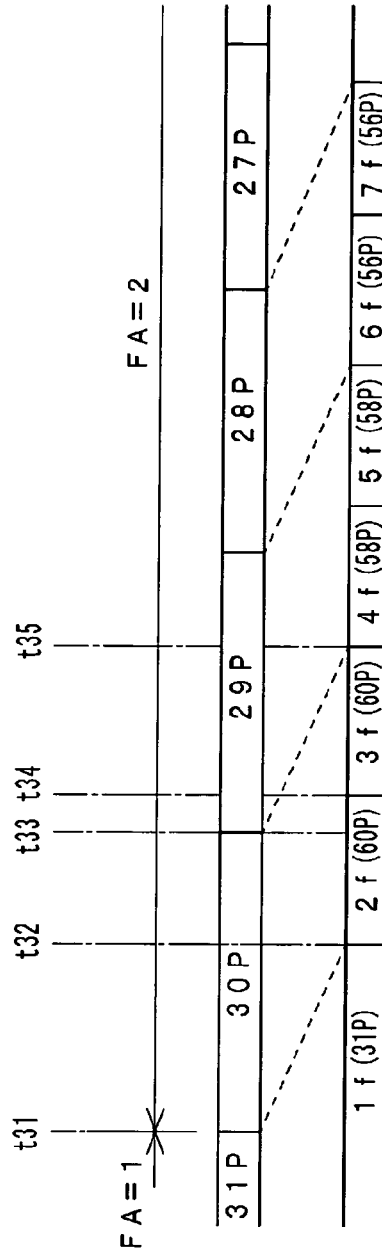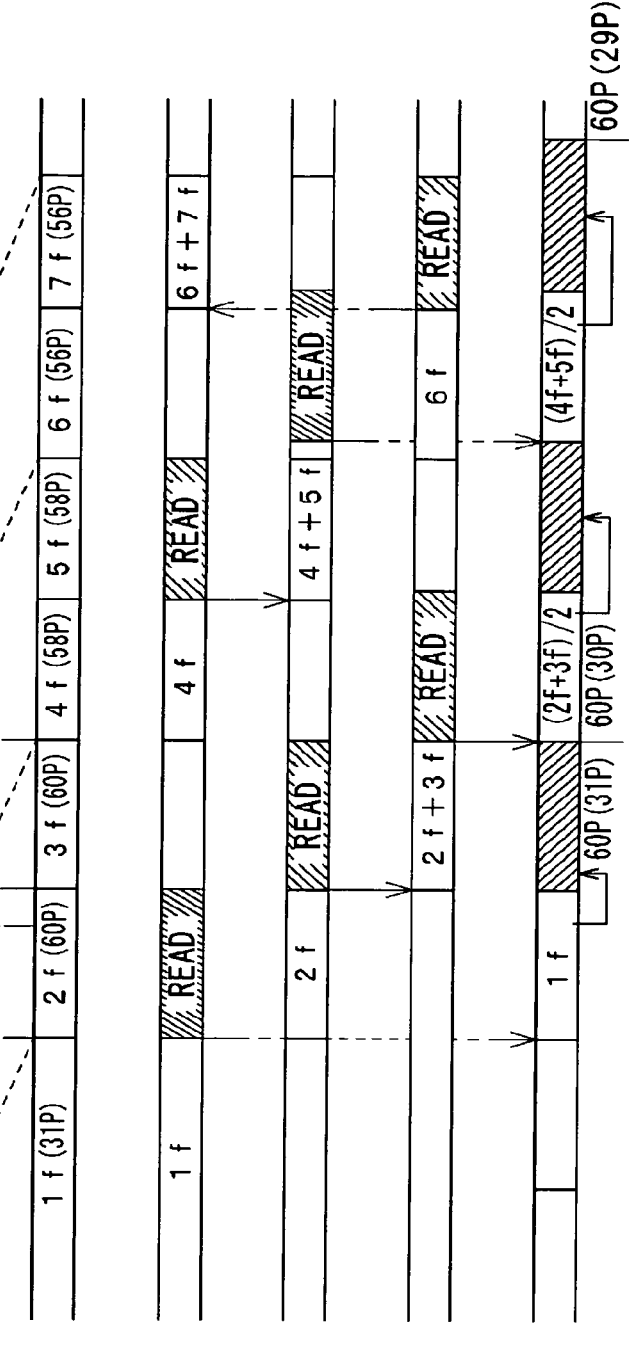

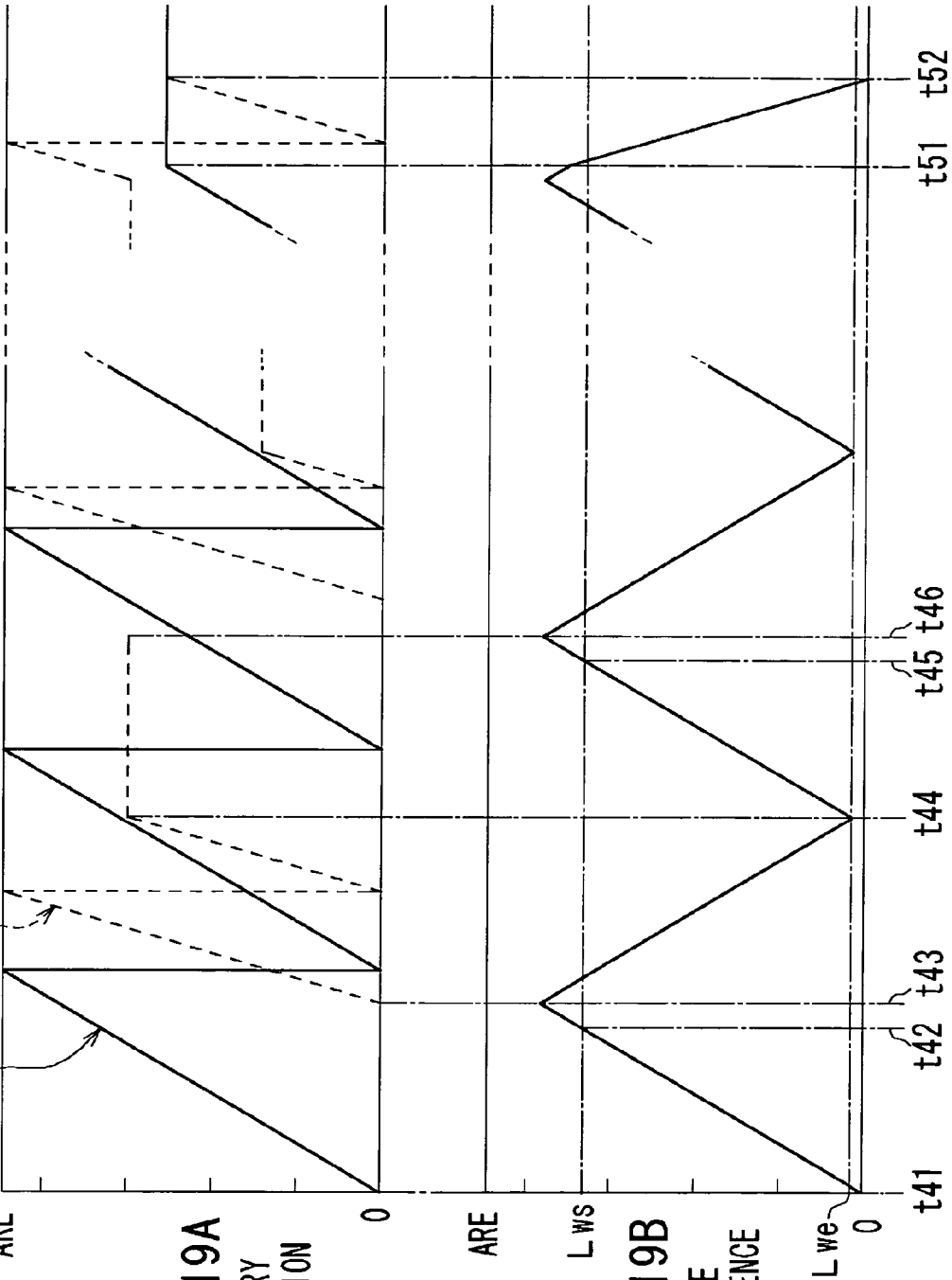

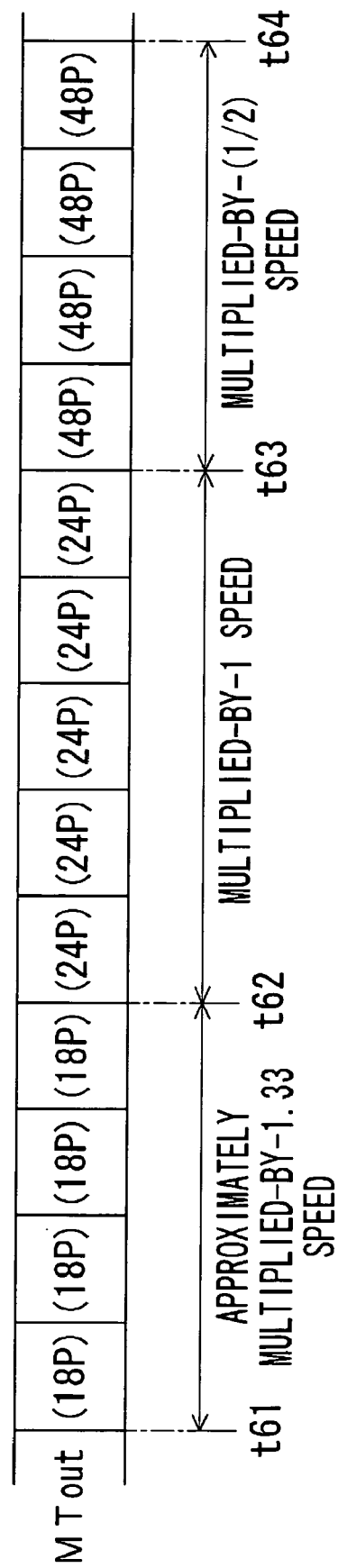

PICKED UP IMAGE RECORDING SYSTEM, SIGNAL RECORDING DEVICE, AND SIGNAL RECORDING METHOD

TECHNICAL FIELD

The present invention relates to a shot-image-recording system and signal-recording device and method

BACKGROUND ART

In conventional movie production etc., to obtain special video effects, a shooting speed of a film camera, that is, the number of frames per second during the shooting varies. For example, if the shooting is made at a speed higher than an ordinary one and played back at the ordinary speed, images are reproduced slowly. Therefore, it is possible to observe easily and in detail a slow motion of, for example, a water droplet falling on a water surface. If the shooting is made at a speed lower than an ordinary one and played back at the ordinary speed, on the other hand, images are reproduced speedily. Therefore, it is possible to present images having high realistic sensations in which a speed sensation is increased in a scene of a fight, car chase, etc.

Further, while in TV program production etc., the digitalization of shooting, editing, broadcasting, etc. for a program has been conventionally involved, film making, etc. is also intended to be digitalized recently owing to improvements in picture quality and decreases in equipment cost as digital technologies has progressed.

Note here that in a case where images are shot using a video camera owing to digitalization of film making etc., to obtain the above-mentioned special video effects, for example, not only image signals obtained by shooting at a predetermined speed but also image signals obtained by shooting at a high speed or a low speed are all recorded in a recording device such as a server so that an image signal of frame images required to obtain the special video effects may be read from these recorded image signals to process the images, thereby creating the image signal that provides special video effects.

In such a manner, the image signals shot at several frame rates are all recorded in the server, so that the server needs to have a large storage capacity. Further, to confirm the special video effects, the image signals must be read from the server to perform image processing, so that those effects cannot be confirmed readily at, for example, a site of film making.

Further, to easily obtain the special video effects such as high speed playback or slow playback, a shooting device that is possible to vary a frame rate during shooting (see, for example, Japanese Patent Application. Laid-open Publication No. 2000-125210) is used to shoot at a frame rate lower than a predetermined one and then, the reproduction thereof is executed at the predetermined frame rate, thereby easily obtaining high speed playback images. Alternatively, by shooting at a higher frame rate and then, the reproduction thereof is executed at the predetermined frame rate, slow playback images can be obtained easily. However, in the case of recording an image signal output from this shooting device, if a recording device has a constant recording frame rate, an image signal having this recording frame rate is generated so that the number of effective picture frames corresponding to the frame rate at the time of shooting may be contained in this image signal. Therefore, if recording the image signal output from the shooting device at the recording frame rate, it is impossible to efficiently record only a signal having a required effective picture frame rate.

DISCLOSURE OF THE INVENTION

The present invention provides a shot-image-recording system for recording an image shot by a shooting device in a recording medium using a signal-recording device, wherein the shooting device comprises shooting means for generating image signal having a shooting frame rate from a shot image, frame-addition-processing means for adding a frame on the basis of the image signal generated by the shooting means and outputting an image signal having a predetermine output frame rate in which the shot image is contained at a variable frame rate together with a validity signal indicating frame of the image having the variable frame rate in the image signal having the output frame rate, and shooting control means for controlling operations of the shooting means and the frame-addition-processing means on the basis of a frame-rate-setting signal, to vary the shooting frame rate and/or switch the number of add frames in the frame addition so that the variable frame rate may be set to a frame rate based on the frame-rate-setting signal, and wherein the signal-recording device comprises storage means, storage control means for selecting an image signal of the image having the variable frame rate from among the image signal having the output frame rate on the basis of the validity signal and storing it in the storage means, recording means for recording the signal in the recording medium, and recording control means for recording the signal stored in the storage means in the recording medium intermittently at a predetermined recording frame rate in accordance with a signal quantity of the image signal stored in the storage means.

This recording control means uses a phase difference between a write position and a read position for the signal as the signal quantity of the image signal stored in the storage means. Furthermore, the signal-recording device comprises image compression means, which image compression means compresses the image signal of the image having the variable frame rate, while the storage control means stores the compressed image signal in the storage means.

Further, this shooting control means generates additional information relevant to the image having the variable frame rate, while the storage control means stores the additional information together with the image signal of the image having the variable frame rate in the storage means. Furthermore, the image signal having the output frame rate is a signal of a common data rate (CDR) system.

A signal-recording device relative to the present invention for recording a signal using an image signal having a predetermined output frame rate in which an image having a variable frame rate is contained and a validity signal indicating a frame of the image having the variable frame rate with respect to the image signal comprises storage means, storage control means for selecting the image signal of the image having the variable frame rate from among the image signal on the basis of the validity signal and storing it in the storage means, recording means for recording the signal stored in the recording medium, and recording control means for recording the signal stored in the storage means in the recording medium intermittently at a predetermined recording frame rate in accordance with a signal quantity of the image signal stored in the storage means.

This recording control means uses a phase difference between a write position and a read position for the signal as the signal quantity of the image signal recorded in the storage means. Furthermore, it comprises image compression means, which image compression means compresses the image signal of the image having the variable frame rate, while the storage control means stores the compressed image signal in the storage means.

A signal-recording method related to the present invention for recording a signal using an image signal having a predetermined output frame rate in which an image having a variable frame rate is contained and a validity signal indicating a frame of the image having the variable frame rate with respect to the image signal comprises the steps of selecting an image signal of the image having the variable frame rate from among the image signal on the basis of the validity signal and storing it in the storage means and recording the signal stored in the storage means in the recording medium intermittently at a predetermined recording frame rate in accordance with a signal quantity of the image signal stored in the storage means.

This method further comprises a step of using a phase difference between a write position and a read position for the signal as the signal quantity of the recorded image signals. Furthermore, the method further comprises steps of compressing the image signal of the image having the variable frame rate and storing the compressed image signal in the storage means.

BRIEF DESCRIPTION OF THE DRAWINGS

FIG. 4 is a flowchart for showing operations to set the number of add frames in accordance with a variable frame rate and a shooting frame rate;

FIG. 5 is a diagram for showing a relationship between addition switchover information and a shooting frame rate;

FIG. 6 is a diagram for showing an outlined configuration of an FIT-type CCD;

FIGS. 12A-12G are diagrams for showing operations in a case where the number of add frames is "3";

FIGS. 13A-13E are diagrams for showing a signal selector set position in a case where the number of add frames is "3";

FIGS. 14A-14G are diagrams for explaining operations to vary an output frame rate (in a case where the number of frames is not varied);

FIGS. 15A-15G are diagrams for explaining operations to vary the output frame rate (in a case where the number of frames is varied);

FIGS. 19A-19B are diagrams for explaining write/read operations performed to an image memory; and FIG. 20 is a flowchart for explaining a playback operation.

BEST MODE FOR CARRYING OUT THE INVENTION

Figure 1:
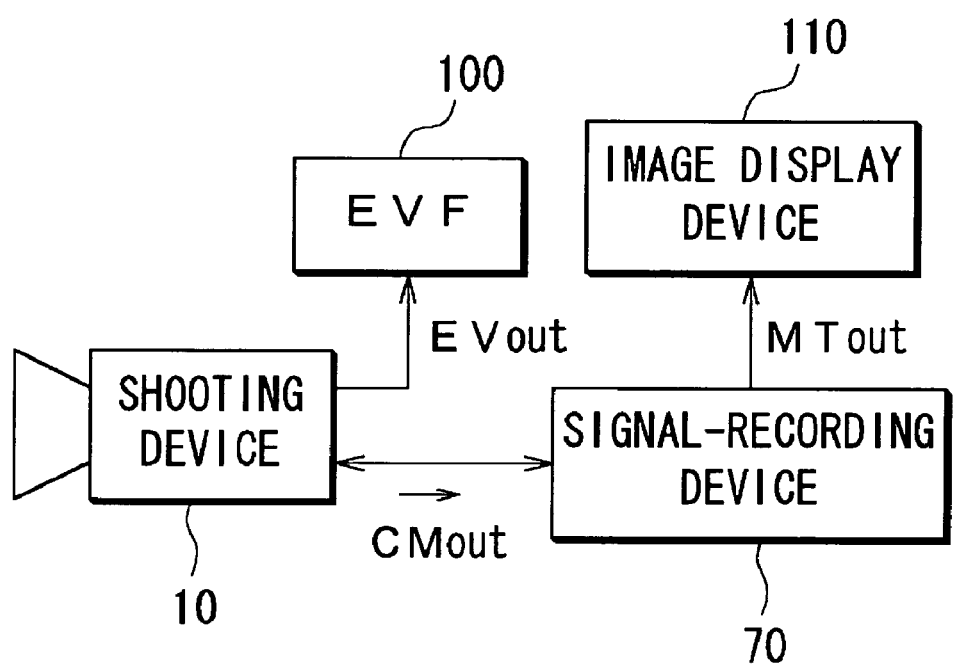
FIG. 1 shows a configuration of a shot-image recording system.

The following will describe a best embodiment with reference to drawings. FIG. 1 shows a configuration of a shot-image-recording system.

A shooting device 10 is constituted using a solid image pickup device such as a charge coupled device (CCD) and so varies a frame rate (hereinafter referred to as "shooting frame rate") FRp of this image pickup device or adding up image signals having a shooting frame rate FRp which is based on a signal output from the image pickup device and controlling the number of additions, thereby generating an image signal of images having a variable frame rate FRc corresponding to a shot image in which the number of frames per second varies. Furthermore, it generates an image signal having a predetermined output frame rate Fc from among the image signals having the variable frame rate FRc and a validity signal indicating a frame of an image having the variable frame rate FRc in this image signal having the output frame rate Fc and supplies them to a signal-recording device 70. Further, an electronic viewfinder (EVF) 100 is connected to the shooting device 10, so that by using this electronic viewfinder 100 to display shot images etc., shooting conditions, for example, an angle of view and brightness, are confirmed.

The signal-recording device 70 selects a signal of an image having the variable frame rate FRc indicated by the validity signal from among the image signals having the output frame rate Fc and records this selected signal in a recording medium at a recording frame rate Fe which is equal to, for example, the output frame rate Fc. Further, when reproducing the recording medium, it generates an image signal having a desired display frame rate Ff and supplies it to an image display device 110, so that the image display device 110 displays reproduced image.

Figure 2:
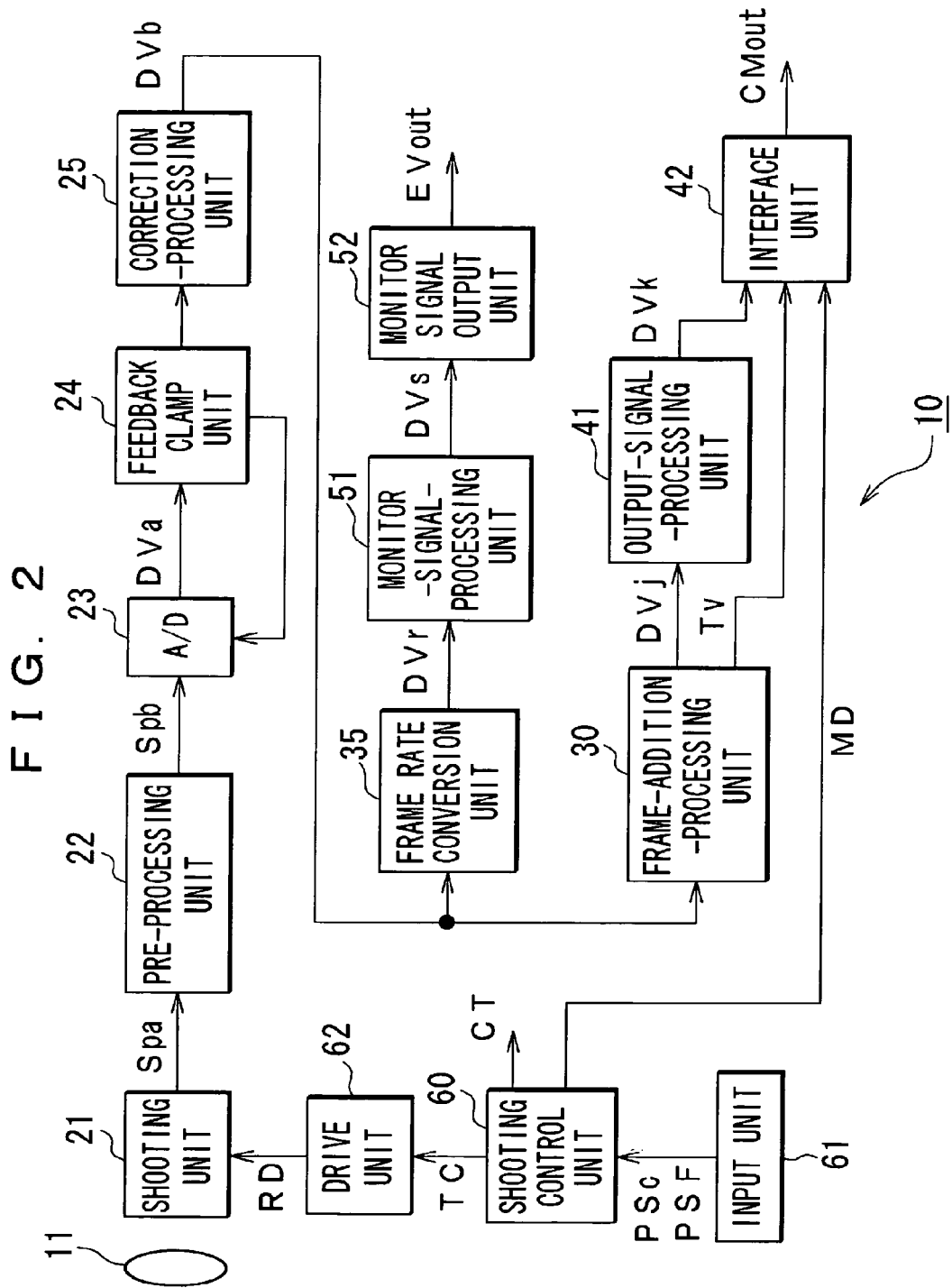
FIG. 2 shows a configuration of a shooting device.

FIG. 2 shows a configuration of the shooting device 10. Light coming through an imaging lens system 11 enters a shooting unit 21, so that an image of an object is formed on an imaging surface of the image pickup device. The image pickup device generates a shot charge of the object image by photoelectric transfer and reads the shot charge on the basis of a drive control signal RD from a later-described drive unit 62 to convert it into a voltage signal. Further, it supplies this voltage signal as a three-primary-color image signal Spa to a pre-processing unit 22.

The pre-processing unit 22 performs processing to remove a noise component from the image signal Spa, for example, correlation double sampling and supplies the noise-free image signal Spa as an image signal Spb to an A/D conversion unit 23. The A/D conversion unit 23 converts the image signal Spb into a digital image signal DVa and supplies it to a feedback clamp unit 24. Further, based on an error signal supplied from the feedback clamp unit 24, it corrects the operation of converting the image signal Spb into the image signal DVa. The feedback clamp unit 24 detects an error between a black-level signal and a reference signal during a blanking interval and supplies it to the A/D conversion unit 23. It is thus possible to obtain an image signal DVa having a stable black level and a desired magnitude by using the A/D conversion unit 23 and the feedback clamp unit 24.

A correction-processing unit 25 performs shading correction on the image signal DVa, correction processing on defectiveness in the image pickup device, correction of a lens aberration of the imaging lens system 11, etc. The image signal DVa that has undergone the correction processing by this correction-processing unit 25 is supplied as an image signal DVb to a frame-addition-processing unit 30 and a frame rate conversion unit 35.

Although in this embodiment, the three-primary-color image signal Spa is output from the shooting unit 21, a luminance signal and a color-difference signal may be output. Further, the signals are not limited to color image signals; for example, an image signal of black-and-white images etc. may be output. Further, the pre-processing unit 22, the feedback clamp unit 24, the correction-processing unit 25 and an output-signal-processing unit 41 and a monitor-signal-processing unit 51, both of which are described later, are provided to obtain a good quality shot image and not in all cases necessary to constitute the shooting device. For example, the image signal Spa may be converted into a digital signal by the shooting unit 21 to be then supplied as the image signal DVb to the frame-addition-processing unit 30 and the frame rate conversion unit 35. Further, the signal may be output not via the output-signal-processing unit 41 or the motion-signal-processing unit 51.

Figure 3:
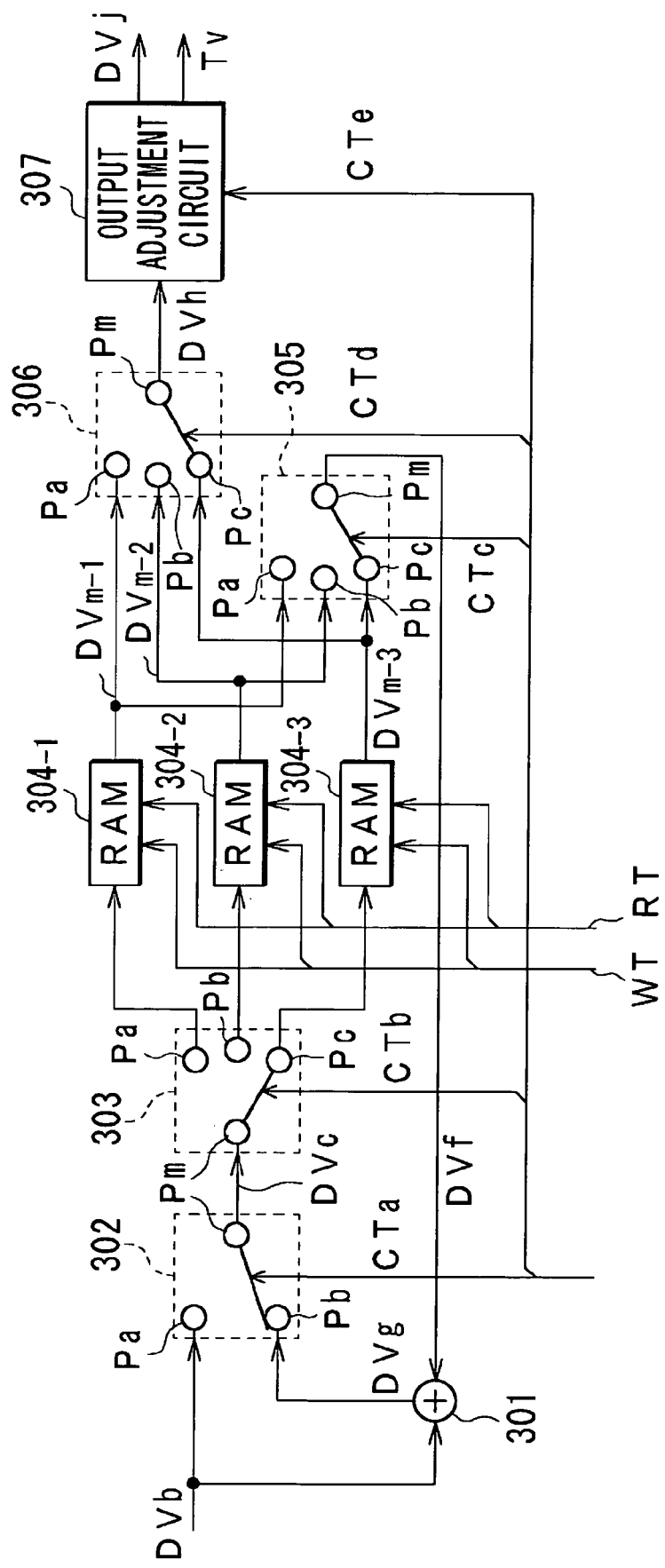
FIG. 3 shows a configuration of a frame-addition-processing unit.

The frame-addition-processing unit 30 performs frame addition processing by use of the image signal DVb on the basis of a control signal CT from a later-described shooting control unit 60. FIG. 3 shows a configuration of the frame-addition-processing unit 30. The image signal DVb supplied from the correction-processing unit 25 is fed to an adder 301 and a signal selector 302 at its terminal Pa. Further, the adder 301 is supplied with an image signal DVf from a later-described signal selector 305. The adder 301 supplies the signal selector 302 at its terminal Pb with an added-up signal DVg obtained by adding up the supplied image signals DVb and DVf.

A movable terminal Pm of the signal selector 302 is connected to a movable terminal Pm of the signal selector 303. This signal selector 302, based on a control signal CTa from the shooting control unit 60, selects either the image signal DVb supplied to the terminal Pa or the added-up signal DVg supplied at the terminal Pb and supplies it as an image signal DVc to the signal selector 303 at its movable terminal Pm.

The signal selector 303, based on a control signal CTb from the shooting control unit 60, connects the movable terminal Pm to any one of the three terminals Pa, Pb, and Pc, to output the image signal DVc supplied from the signal selector 302 through the selected terminal. The terminal Pa of this signal selector 303 is connected to a signal input terminal of a random access memory (RAM) 304-1. The terminal Pb, on the other hand, is connected to a signal input terminal of an RAM304-2 and the terminal Pc, to a signal input terminal of an RAM304-3.

The RAM304-1, based on a write control signal WT supplied from the shooting control unit 60, reads the image signal DVc output from the terminal Pa of the signal selector 303 and stores it. Further, the RAM304-1, based on a read control signal RT supplied from the shooting control unit 60, read the stored image signal DVc and supplies it as an image signal DVm-1 to the terminal Pa of the signal selector 305 and the terminal Pa of the signal selector 306.

Similarly, the RAMs304-2 and 304-3 read the image signals DVc output from the respective terminals Pb and Pc of the signal selectors 303 on the basis of the write control signal WT supplied from the shooting control unit 60 and store them. Further, the image signals DVc stored in the RAMs304-2 and 304-3 are read on the basis of the read control signal RT supplied from the shooting control unit 60 and supplied as image signals DVm2 and DVm-3 to the terminals Pb and Pc of the signal selectors 305 and the terminals Pb and Pc of the signal selector 306, respectively.

The movable terminal Pm of the signal selector 305 is connected to the adder 301. This signal selector 305, based on a control signal CTc from the shooting control unit 60, switches the movable terminal Pm to any one of the terminals Pa through Pc to select any one of the image signals DVm-1 through DVm-3 and supplies it as the image signal DVf to the adder 301.

The movable terminal Pm of the signal selector 306 is connected to an output adjustment circuit 307. This signal selector 306, based on a control signal CTd from the shooting control unit 60, switches the movable terminal Pm to any one of the terminals Pa through Pc to select any one of the image signals DVm-1 through DVm-3 and supplies it as an image signal DVh to the output adjustment circuit 307.

The output adjustment circuit 307, based on a control signal CTe supplied from the shooting control unit 60, adjusts a signal level of the image signal DVh according to the number of added frames and supplies the output-signal-processing unit 41 with it as an image signal DVj having the predetermined output frame rate Fc in which the shot images are contained at the variable frame rate. Further, for the image signal DVj, it generates a validity signal Tv indicating a frame of the image having the variable frame rate and supplies it to an interface unit 42.

The frame rate conversion unit 35 converts a frame rate of the image signal DVb into a frame rate that matches a component connected for the purpose of confirmation of shot images, for example, the electronic viewfinder 100 and supplies it as an image signal DVr to the monitor-signal-processing unit 51.

The output-signal-processing unit 41 performs process treatment such as γprocessing, profile compensation processing, and Knee correction processing on the image signal DVj. Further, the motion-signal-processing unit 51 performs on the image signal DVr process treatment in accordance with the electronic viewfinder 100 etc. connected for confirmation of shot images. For example, in the case of displaying an image to confirm a shot image using a CRT or an LCD, it performs process treatment such as γ correction and gradation display correction that matches the CRT or the LCD. By thus providing the output-signal-processing unit 41 and the motion-signal-processing unit 51, process treatments for the image signals DVj and DVr can be performed separately from each other.

An image signal DVk obtained by performing the process treatment at this output-signal-processing unit 41 is supplied to an interface unit 42. Further, the motion-signal-processing unit 51 supplies a monitor signal output unit 52 with an image signal DVs obtained by performing the process treatment.

The interface unit 42 converts the image signal DVk into a signal CMout that matches a recording apparatus etc. to be connected to the video camera. For example, in a case where an apparatus accommodating a component signal or an apparatus accommodating a composite signal is to be connected, it converts the image signal DVk into signals that match these apparatuses respectively. Further, in a case where the image signal is transmitted through, for example, a serial digital interface standardized as SMPTE259M or SMPTE292M, it converts the image signal DVk into a signal that conforms to the interface standards. Furthermore, the interface unit 42 is provided with the validity signal Tv from the frame-addition-processing unit 30 as well as additional information MD from the shooting control unit 60, so that the interface unit 42 provides the signal CMout with the validity signal Tv and the additional information MD in a condition where they correspond to each of the frames in the image signal DVk and supplies this signal CMout to the signal-recording device 70.

The monitor signal output unit 52 converts the supplied image signal DVs into a signal EVout that matches the electronic viewfinder 100 provided for confirmation of shot images and supplies it to the electronic viewfinder 100.

To the shooting control unit 60, an input unit 61 is connected, so that the shooting control unit 60 is supplied, from the input unit 61, with a signal in accordance with a user operation or a signal from a remote controller or an external apparatus etc. as operation signal PSc. The shooting control unit 60, based on the operation signal PSc, generates the control signal CT etc., to control operations of the various units, thereby causing the shooting device to operate in accordance with the user-operation signal or the signal from the remote controller or the external apparatus etc. Further, when supplied, as the operation signal PSc, with a frame rate setting signal PSF that sets a variable frame rate, the shooting control unit 60 generates a control signal TC that sets a shooting frame rate at the shooting unit 21 on the basis of the frame rate setting signal PSF and supplies it to the drive unit 62. This drive unit 62, based on the control signal TC, generates a drive control signal RD and supplies it to the shooting unit 21, thereby causing the shooting unit 21 to output the image signal Spa having a shooting frame rate on the basis of the frame rate setting signal PSF. Further, based on the frame rate setting signal PSF, it generates the control signals CTa, CTb, CTc, CTd, and CTe, and the write control signal WT and the read control signal RT and supplies them to the frame-addition-processing unit 30. By thus controlling the operations of the shooting unit 21 and the frame-addition-processing unit 30 on the basis of the frame rate setting signal PSF, the shooting device 10 is caused to generate an image signal having a predetermined output frame rate in which shot images are contained at a set value of the variable frame rate.

Furthermore, the shooting control unit 60 generates information relevant to images having a variable frame rate, for example, the additional information MD that indicates a shot date and time and imaging conditions and supplies it to the interface unit 42.

The following will describe operations of the shooting device 10. This shooting device 10 controls generation of an image signal at the shooting unit 21 so that the shooting unit 21 may generate the image signal Spa having a frame rate varied within a predetermined range without changing a sampling frequency and switches the number of add frames at the frame-addition-processing unit 30 to thereby generate the image signal DVj having a predetermined output frame rate.

In this case, to generate the image signal DVj having the variable frame rate FRc, even if the variable frame rate FRc is supposed to be low, the number of add frames FAD at the frame-addition-processing unit 30 is switched so that the shooting frame rate FRp which is a frame rate of the image signal Spa generated by the shooting unit 21 may fall in a predetermined range. Further, the number of add frames FAD is set so that, for example, when the number of add frames FAD is switched, the shooting frame rate FRp may fall in the predetermined range and be high in value.

FIG. 4 is a flowchart for showing operations to set the number of add frames FAD and the shooting frame rate FRp in accordance with the variable frame rate FRc. At step ST1, a switchover point of the number of add frames and the number of add frames are set. In the setting, the shooting frame rate FRp is divided by a positive integer, so that an integer value at which a quotient of this division turns integer (except 1) is set to the switchover point. This quotient is set to the number of add frames FAD. For example, if a maximum value of the shooting frame rate FRp is "60P (the numeral indicates the number of frames per second and P indicates the signal being of a progressive type, which hold with the other cases)", the set switchover points of the number of add frames and the numbers of add frames are (30P, 2 frames), (20P, 3 frames), (15P, 4 frames), (12P, 5 frames), (2P, 30 frames), (1P, 60 frames).

At step ST2, based on the switchover point of the number of add frames and the number of add frames set at step ST1, the process generates addition switchover information that indicates a relationship between the variable frame rate FRc and the number of add frames. In this case, if the switchover point of the number of add frames and the number of add frames are set on the assumption that the maximum value of the shooting frame rate FRp is 60P, the addition switchover information is generated as shown in FIG. 5. That is, if the variable frame rate FRc is "60P≧FRc>30P", the number of add frames FAD is set to "1". If the variable frame rate FRc is "30P≧FRc>20P", the number of add frames FAD is set to "2". If the variable frame rate FRc is "20P≧FRc>15P", the number of add frames FAD is set to "3". Similarly, if the variable frame rate FRc is "2P≧FRc>1P", the number of add frames FAD is set to "30" and if the variable frame rate FRc is "FRc=1P", the number of add frames FAD is set to "60".

At step ST3, the process determines the number of add frames that corresponds to a variable frame rate FRc, which is set by the user, on the basis of the addition switchover information. For example, if the set variable frame rate FRc is "45P", the number of add frames FAD is "1". Further, if the set variable frame rate FRc is "14P", the number of add frames FAD is "4".

At step ST4, the process determines a shooting frame rate. In this determination, the process multiplies the number of add frames FAD, which are determined at step ST3, and the set variable frame rate ERc and set a resultant product to the shooting frame rate FRp. For example, if the variable frame rate FRc is "45P", the shooting frame rate FRp is set to "45P" because the number of add frames FAD is "1". Further, if the variable frame rate FRc is "14P", the shooting frame rate FRp is set to "56P" because the number of add frames FAD is "4". Further, if the variable frame rate FRc is varied, a variable range of the shooting frame rate FRp is on the side of the maximum value. For example, if the variable frame rate FRc is varied in a range of "20P≧FRc>15P", the variable range of the shooting frame rate FRp becomes "60P≧FRp>45P", which is on the side of the maximum value. Note here that in FIG. 5, the range of the shooting frame rate FRp with respect to the range of the variable frame rate FRc is shown together with the addition switchover information.

Thus, even if the variable frame rate FRc is varied within a range of "60P through 1P", the number of add frames can be switched to control the shooting frame rate FRp into a range of "60P through 30P". Further, a variable range of the shooting frame rate FRp with respect to each number of add frames can be set to the side of a maximum value of the shooting frame rate FRp, so that it is possible to obtain the image signal DVj having a desired output frame rate on the basis of an image signal Spa of more speedily shot images.

The shooting control unit 60 performs the above-mentioned processing of FIG. 4 to determine the shooting frame rate FRp and the number of add frames FAD for a variable frame rate FRc which is set by the frame rate setting signal PSF from the input unit 61.

Note here that in a case where the variable frame rate FRc of the image signal DVj is set in a range of "60P≧FRc>30P" on the basis of the frame rate setting signal PSF, to output the signal CMout generated on the basis of this image signal DVj from the shooting device, the shooting control unit 60 controls the frame-addition-processing unit 30 to set the number of add frames FAD to "1". Further, it controls operations of the drive unit 62 so that the drive unit 62 may supply the shooting unit 21 with the drive control signal RD that is the shooting frame rate FRp of the image signal Spa output from the shooting unit 21 multiplied by an FAD of the variable frame rate.

Further, in a case where the variable frame rate FRc is set in a range of "30P≧FRc>20p" on the basis of the frame rate setting signal PSF, the shooting control unit 60 controls the frame rate addition processing portion 30 to set the number of add frames FAD to "2". Further, the shooting control unit 60 controls the operations of the drive unit 62 so that the drive unit 62 may supply the shooting unit 21 with the drive control signal RD that is the shooting frame rate FRp of the image signal Spa output from the shooting unit 21 multiplied by an FAD (twice as large) of the variable frame rate FRc. In this case, two frames of the image signal having the shooting frame rate are added to generate the image signal DVj, so that the image signal DVj has a desired output frame rate. Further, since the shooting frame rate FRp comes in a range of "60P≧FRp>40P", the shooting frame rate can be controlled into the range of "60P≧FRp>30P".

Similarly, to set the variable frame rate FRc in a range of "15P≧FRc>12P", the shooting control unit 60 controls the frame-addition-processing unit 30 to set the number of add frames FAD to "4". Further, the shooting control unit 60 controls the operations of the drive unit 62 so that the drive unit 62 may supply the shooting unit 21 with the drive control signal RD that is the shooting frame rate FRp of the image signal Spa output from the shooting unit 21 by an FAD (four-fold) of the variable frame rate FRc. In this case, four frames of the image signal having the shooting frame rate are added to generate the image signal DVj, so that the image signal DVj has a desired output frame rate. In this case, the shooting frame rate comes in a range of "60P≧FRp>40P", so that the shooting frame rate can be controlled into a range of "60p≧FRp>30P".

Similarly, by varying the shooting frame rate FRp of the image signal Spa generated by the shooting unit 21 and the number of add frames FAD at the frame-addition-processing unit 30, it is possible to obtain the image signal DVj having a desired variable frame rate FRc. Note here that by holding beforehand the table of FIG. 5 concerning the addition switchover information and the shooting frame rate, it is of course unnecessary to perform processing of the flowchart shown in FIG. 4 each time the variable frame rate FRc is switched.

The following will describe varying operation of the shooting frame rate FRp of the image signal Spa generated by the shooting unit 21. FIG. 6 shows an outlined configuration of a frame interline transfer (FIT)-type CCD as an example of the image pickup device used in the shooting unit 21. An shooting region 211a of a CCD210 has a matrix of photoelectric transfer devices 212 and vertical transfer registers 214 each of which is used to transfer to an accumulation region 211b a shot charge supplied from each of the photoelectric transfer devices 212 via a sensor gate 213. The vertical transfer registers 214 are provided as many as a number that is supposed to correspond to the number of pixels per line. The number of transfer steps of each of the vertical transfer registers 214 corresponds to the number of scanning lines.

The accumulation region 211b of the CCD210 is used to accumulate shot charges of, for example, pixels of one frame and constituted of vertical transfer registers 215 having a configuration similar to that of the vertical transfer registers 214 of the shooting region 211a.

Further, the shooting unit 21 has a horizontal transfer register 216 and a signal output circuit 217 connected to an output terminal side of the horizontal transfer register 216. The number of transfer stages of the horizontal transfer register 216 is supposed to correspond to the number of pixels per line. Further, the signal output circuit 217 converts shot charges supplied from the horizontal transfer register 216 into a voltage signal and output it.

The shooting unit 21 having such a configuration is controlled in operation when it is supplied, from the drive unit 62, with a variety of timing signals such as a sensor gate pulse for opening each of the sensor gates 213, a vertical transfer clock pulse for driving the vertical transfer register 214, a vertical transfer clock pulse for driving the vertical transfer register 215 of the accumulation region 212b, and a horizontal transfer clock pulse for driving the horizontal transfer register 216, as drive control signal RC.

The shot charge generated by the photoelectric transfer device 212 of the shooting region 211a is read by each of the vertical transfer registers 214 via the sensor gate 213 during a vertical blanking interval and the shot charge thus read is transferred to the vertical transfer register 215 of the accumulation region 211b at a high speed to be accumulated. Then, the shot charges accumulated in the accumulation region 211b are read to the horizontal transfer register 216 by as much as one line during a horizontal blanking interval and transferred to the signal output circuit 217 sequentially. The signal output circuit 217 converts the supplied shot charges into a voltage signal and outputs it. It is thus possible to obtain image signal of one line from the signal output circuit 217. During the next horizontal scanning time also, the same processing can be performed to obtain the image signal of next one line from the signal output circuit 217. Similarly, the image signal of one frame can be obtained.

Then, signals of the vertical transfer registers 214 can be flushed during the vertical blanking interval to reduce smears and the shot charges generated by the photoelectric transfer device 212 can be read via the sensor gate 213 to the vertical transfer registers 214 to perform the above-mentioned processing, thereby generating the image signal Spa.

Note here that the image pickup device used in the shooting unit 21 is not limited to a frame interline transfer (FIT) type CCD but may be an interline transfer (IT) type CCD etc.

In the case of varying the shooting frame rate FRp of the image signal Spa, the drive control signal RD supplied from the drive unit 62 to the shooting unit 21 can be used to control a charge accumulation period, an imaging charge read timing, etc. at the CCD210, thereby obtaining the image signal Spa having a varied frame rate. Furthermore, if the shooting frame rate FRp is varied using a common data rate system (CDR system: common sampling frequency system), it is possible to generate such an image signal Spa that an image size during a valid screen period may not change even if the shooting frame rate FRp is varied. Further, by using the CDR system, the configuration is made simple because it is unnecessary to vary an operating frequency of each unit that uses the shooting frame rate FRp, in accordance with the shooting frame rate FRp.

Figure 7:
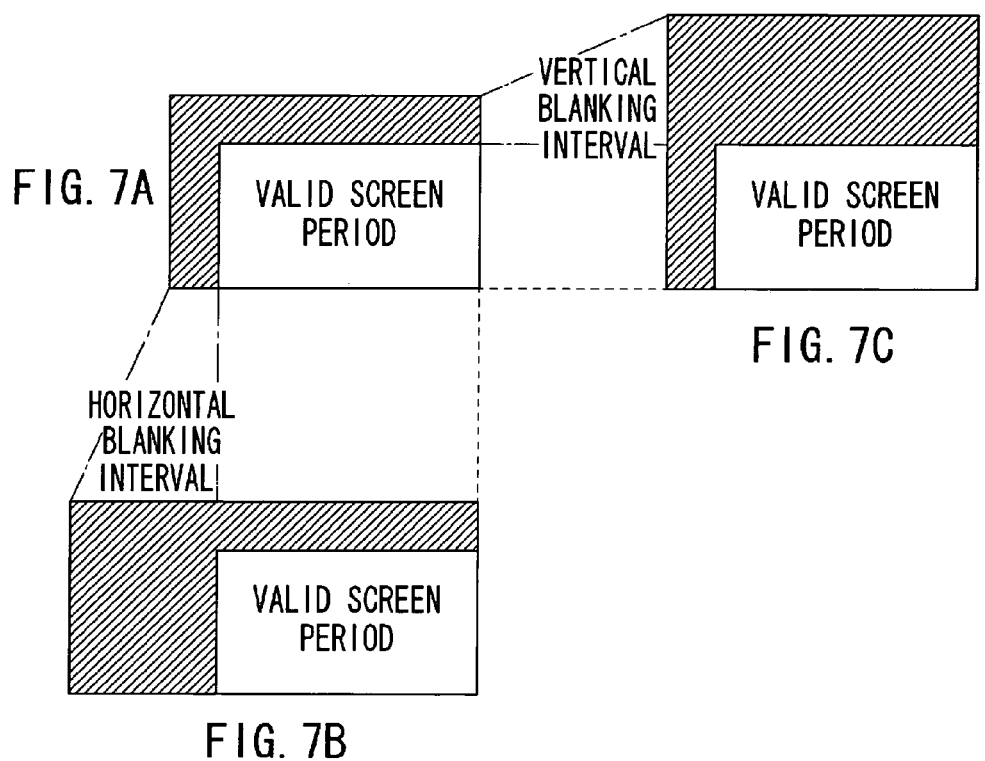
FIGS. 7A-7C are diagrams for explaining a blanking interval and a valid screen period in a case where a CDR system is used.

According to this CDR system, by adjusting duration of a horizontal blanking interval as shown in FIG. 7B or that of a vertical blanking interval as shown in FIG. 7C for an image signal whose blanking interval and valid screen period have been set as shown in FIG. 7A, it is possible to generate an image signal having a varied shooting frame rate FRp without changing the image size during the valid screen period.

Figure 8:
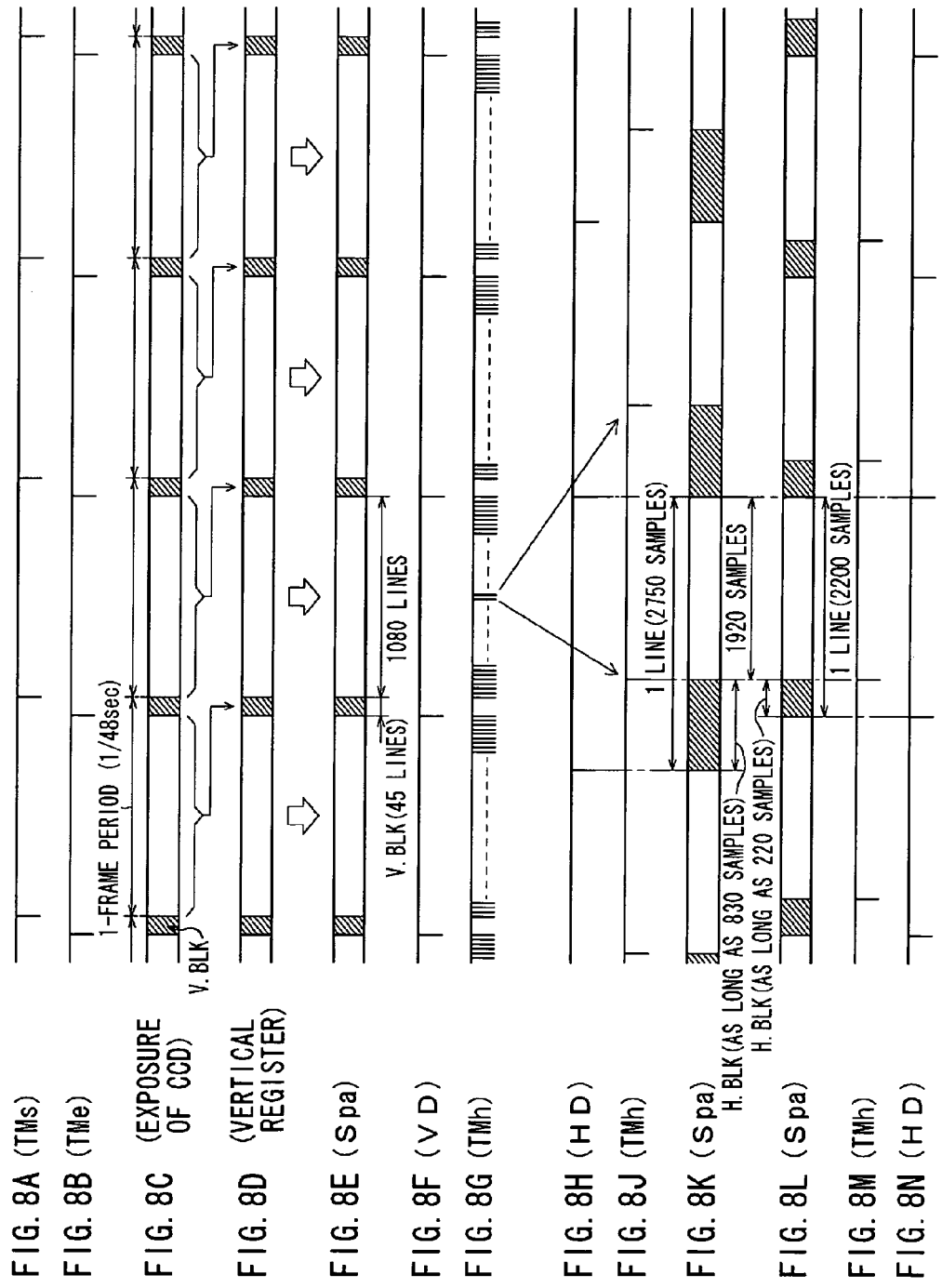
FIGS. 8A-8H and 8J-8N are diagrams for explaining operations in the case of adjusting duration of a horizontal-blanking interval.

FIGS. 8A-8H and 8J-8N are diagrams for explaining operations in the case of adjusting duration of the horizontal blanking interval and FIG. 9A-9G are diagrams for explaining operations in the case of adjusting duration of the vertical blanking interval. FIG. 8A shows an exposure starting timing TMs and FIG. 8B, an exposure ending timing TMe. An interval of the exposure starting timing TMs and that of the exposure ending timing TMe are equal to a frame period of the shooting frame rate FRp, while a period from the exposure ending timing to the next exposure starting timing corresponds to the vertical blanking interval V.BLK as shown in FIG. 8C. Further, a period from the exposure starting timing to the next exposure ending timing makes up an exposure period.

Shot charge generated at the photoelectric transfer device 212 during an exposure period is read to the vertical transfer register 215 shown in FIG. 6 during the next vertical blanking interval as shown in FIG. 8D.

The charges read to the vertical transfer registers 215 are read for each line to the horizontal transfer registers 216 with respect to each read starting pulse of a horizontal read starting signal TMh shown in FIG. 8G and supplied to the signal output circuit 217 sequentially at a sampling frequency, to generate a signal of one line for the valid screen period in the image signal Spa such as shown in FIG. 8E. Note here that FIG. 8F shows a vertical synchronization signal VD.

FIGS. 8H, 8J, and 8K show portions of a frame period, of which FIG. 8H shows a horizontal synchronization signal and FIG. 8J shows the horizontal read starting signal TMh, which provides a reference for generation of a signal of one line for the valid screen period as described above. Note here that a period from a synchronization pulse of the horizontal synchronization signal HD to a read starting pulse of the horizontal read starting signal TMh corresponds to a horizontal blanking interval H, BLK in the image signal Spa shown in FIG. 8K, while a period from a read starting pulse of the horizontal read starting signal TMh to a synchronization pulse of the next horizontal synchronization signal HD provides a valid screen period.

FIGS. 8L-8N show signal portions when the shooting frame rate FRp is high, of which FIG. 8N shows the horizontal synchronization signal HD and FIG. 8M shows the horizontal read starting signal TMh. In this case, if the horizontal blanking interval H.BLK, which is a period from a synchronization pulse of the horizontal synchronization signal HD to a read starting pulse of the horizontal read starting signal TMh, is changed from such as shown in FIG. 8K into a shorter one such as shown in FIG. 8L, an interval of the horizontal synchronization signal HD is reduced to increase the shooting frame rate FRp. Further, a period is made constant from a read starting pulse of the horizontal read starting signal HD to a synchronization pulse of the next horizontal synchronization signal HD. That is, by making constant the sampling frequency and the number of pixels during the valid screen period, it is possible to generate such a CDR-system image signal Spa shown in FIG. 8K or 8L that the valid screen period may be constant irrespective of the shooting frame rate FRp. Note here that FIGS. 8A-8H, FIG. 8J and FIG. 8K show the number of lines and the number of samples in the case of "48P" when the valid screen period is 1920 samples×1080 lines, while FIGS. 8L-8N show the number of lines and the number of samples in the case of "60P" when the valid screen period is 1920 samples×1080 lines.

The following will describe operations in the case of adjusting the duration of the vertical blanking interval with reference to FIGS. 9A-9G. Note here that FIGS. 9A-9D correspond to FIGS. 8A-8D respectively.

Figure 9:
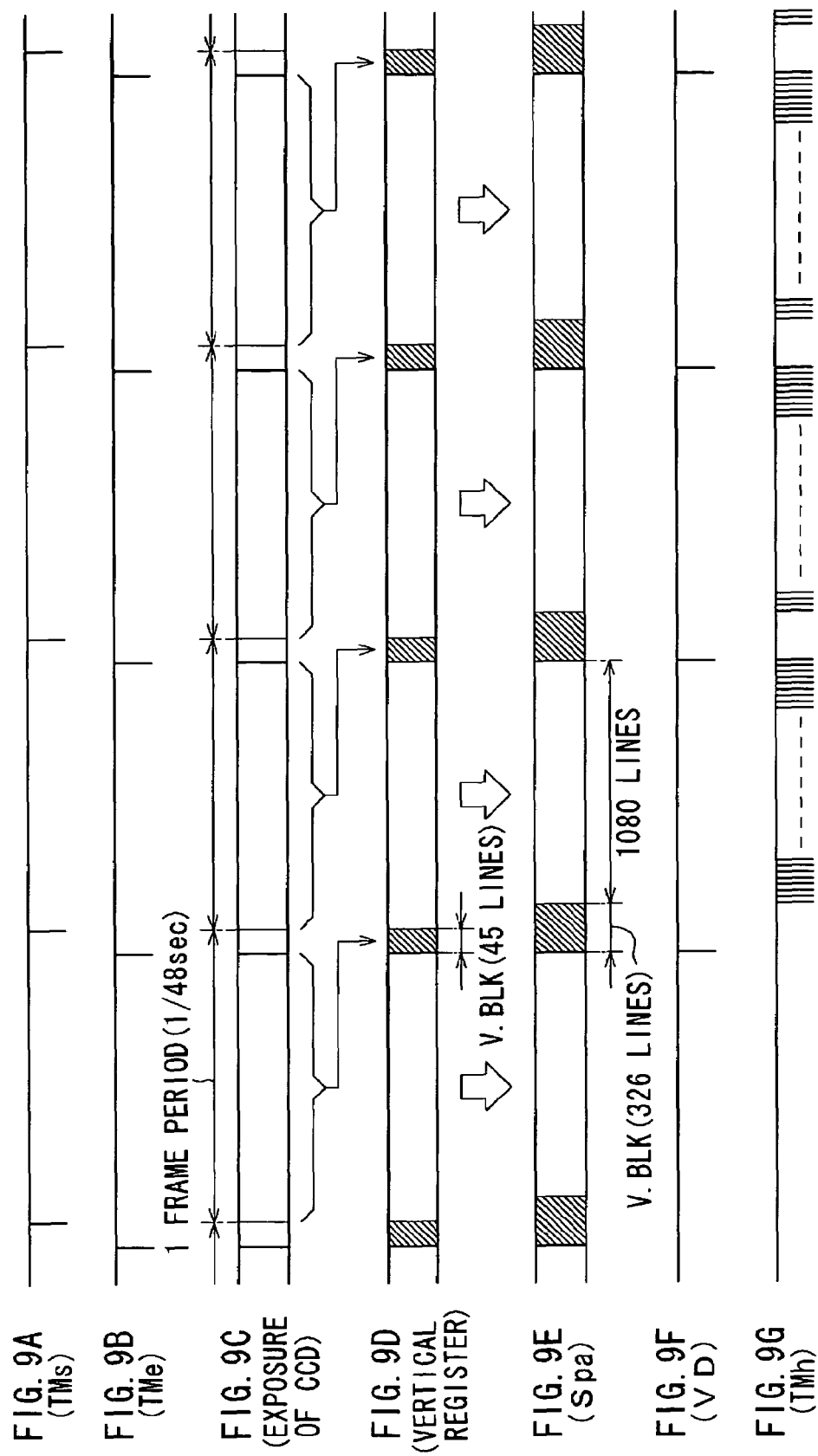
FIGS. 9A-9G are diagrams for explaining operations in the case of adjusting duration of a vertical blanking interval.

Charges read to the vertical transfer registers 215 are read for each line to the horizontal transfer registers 216 with respect to each read starting pulse of the horizontal read starting signal TMh shown in FIG. 9G and the shot charges thus read are then supplied to the signal output circuit 217 sequentially, to generate the image signal Spa as shown in FIG. 9E. In this case, the vertical blanking interval V.BLK is adjusted which is a period from a synchronization pulse of the vertical synchronization signal VD shown in FIG. 9F to a read starting pulse of a first horizontal read starting signal TMh for each of the frames shown in FIG. 9G. Further, by making constant a period from a read starting pulse of the first horizontal read starting signal TMh to a synchronization pulse of the vertical synchronization signal VD, it is possible to generate such a CDR-system image signal Spa shown in FIG. 9E that the valid screen period is made constant irrespective of the shooting frame rate FRp.

In such a manner, by making constant the sampling frequency and the number of pixels during the valid screen period and making variable the horizontal and vertical blanking intervals in accordance with the shooting frame rate FRp, it is possible to generate such an image signal Spa that the valid screen period may be constant and the image size may not change even if the shooting frame rate FRp is varied. Note here that if, for example, the vertical blanking interval is prolonged in accordance with the shooting frame rate FRp, an interval until the next frame image is displayed is prolonged so that flickering may be conspicuous. Therefore, it is desirable to adjust the horizontal blanking interval in accordance with the shooting frame rate FRp.

Figure 10:
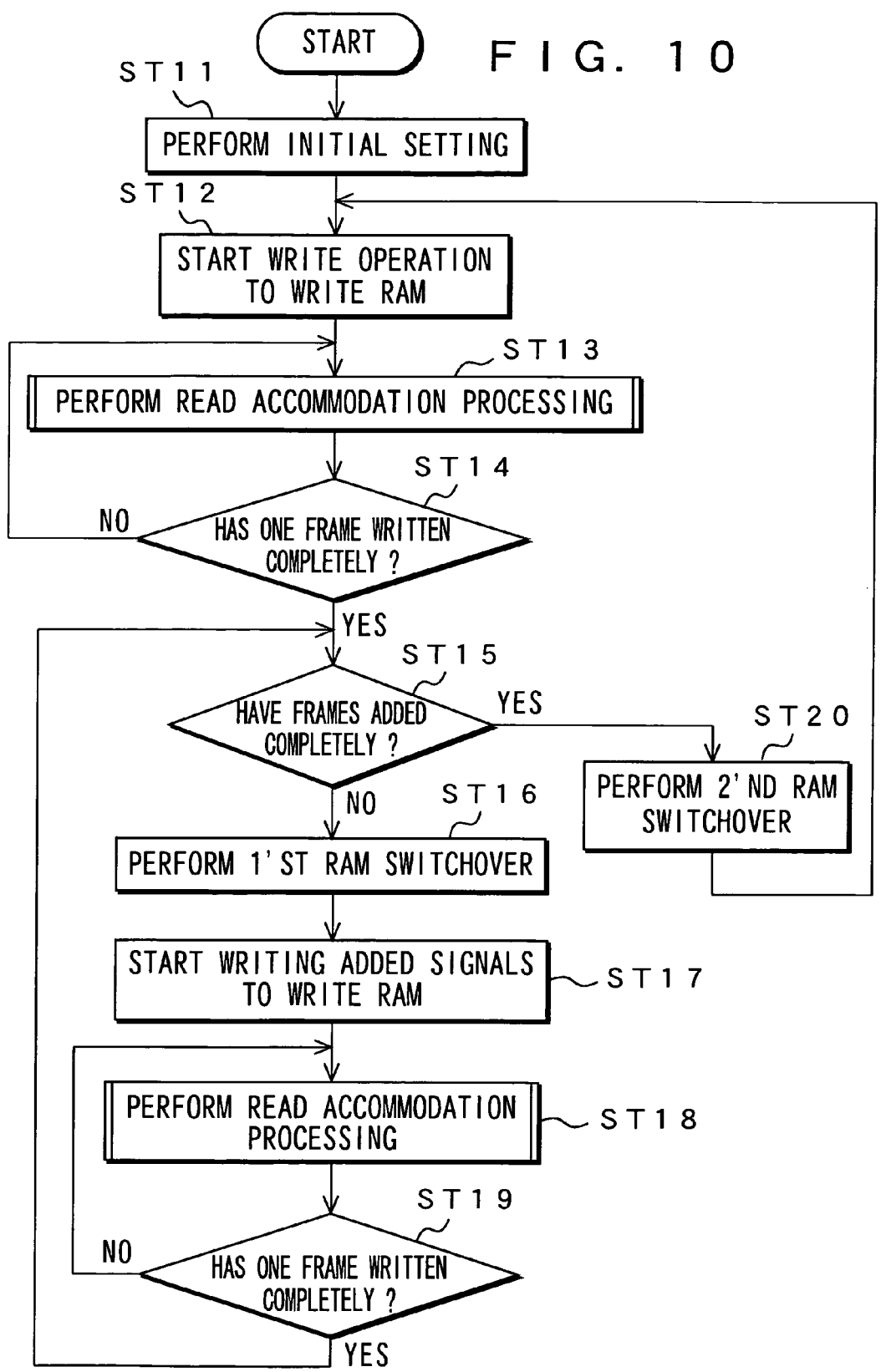
FIG. 10 is a flowchart for showing a frame addition operation.

The following will describe an operation of frame addition performed in the frame-addition-processing unit 30. FIG. 10 is a flowchart for showing the frame addition operation.

At step ST11, the process performs initial setting. In this initial setting, the process specifies any one of the RAMs304-1 through 304-3 as a write RAM in which the image signal DVc is written. This write RAM can be specified by switching the movable terminal Pm of the signal selector 303 using the control signal CTh. Further, an external readability flag is provided which indicates whether frames have been added completely as many as the number of add frames FAD and set to an OFF state indicating that frame addition processing has not yet completed.

At step ST12, the process supplies a write control signal WTa to the write RAM to start writing the image signal DVc to the write RAM.

At step ST13, the process read accommodation processing. This read accommodation processing is performed to output an image signal at the variable frame rate FRc, so that if frame addition has completed, the process generates and outputs an image signal having the variable frame rate FRc on the basis of a signal obtained by the frame addition. If the frame addition has not yet completed, on the other hand, the process provides a blank frame.

Figure 11:
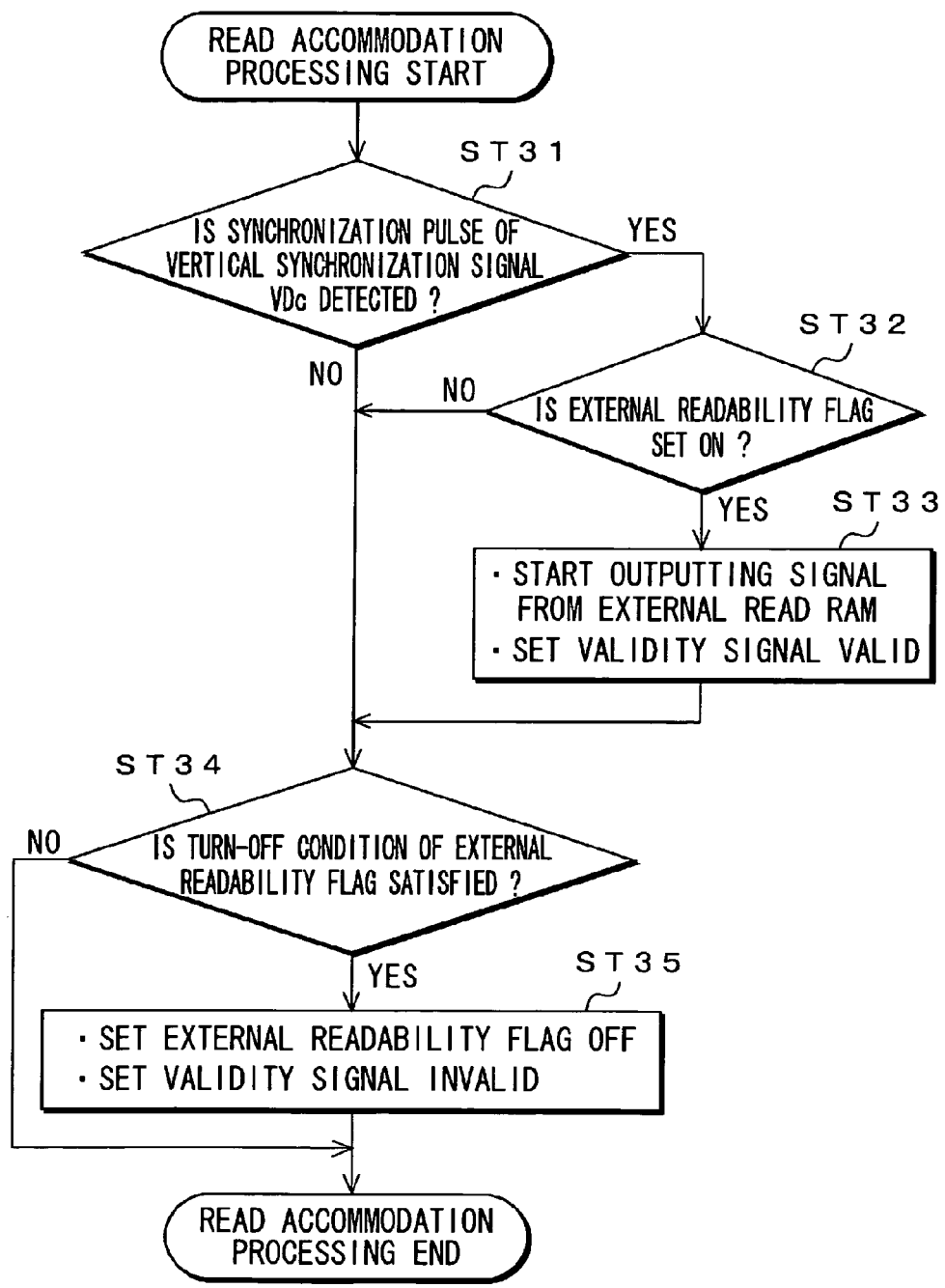
FIG. 11 is a flowchart for showing read accommodation processing.

FIG. 11 is a flowchart for showing read accommodation processing. At step ST31, the process decides whether a synchronization pulse is detected in an external reading vertical synchronization signal VDc having the variable frame rate FRc. If the synchronization pulse is detected in the vertical synchronization signal VDc, the process goes to step ST32 and, otherwise, goes to step ST34.

At step ST32, the process decides whether the external readability flag is set ON. If the external readability flag is not set ON, the process provides a blank frame and goes to step ST34 because no signal is received which indicates that frames as many as the number of add frames FAD are added completely. If the external readability flag is set ON, on the other hand, the process goes to step ST33, where the process starts reading the signal from a later-described external read RAM to which the signal indicating completion of addition of frames as many as the number of add frames FAD has been written and goes to step ST34. Further, the process regards a frame of the signal read from the external read RAM to be that of an image having the variable frame rate and "validates" the validity signal Tv for this frame.

At step ST34, the process decides whether a condition is met to set OFF the external readability flag. If, in this case, the signal of one frame has been read completely from the external read RAM, the process decides the set-OFF condition of the external readability flag is met and goes to step ST35. If the signal of one frame is not read completely from the external read RAM or the signal is not read or the external readability flag is set OFF, on the other hand, the process ends the read accommodation processing. At step ST35, the process set OFF the external readability flag. Further, when it has set OFF the external readability flag, the process releases specification of the external read RAM and ends the read accommodation processing. Furthermore, the process switches the validity signal Tv from being "valid" to "invalid".

At step ST14, the process decides whether the signal of one frame has been written completely to the write RAM. If the signal of one frame is yet to be written completely, the process returns to step ST13 and, otherwise, goes to step ST15.

At step ST15, the process decides whether frames have been added completely as many as the number of add frames FAD. If, in this case, frames as many as the number of add frames FAD are yet to be added completely, the process goes to step ST16 and, otherwise, goes to step ST20.

At step ST16, the process performs first RAM switchover. In this first RAM switchover processing, the write RAM is switched to specify any other unspecified RAM as the write RAM. Further, an RAM specified as the write RAM before the switchover is specified as an internal read RAM. Furthermore, pre-switchover specification of an internal read RAM is released.

At step ST17, the process starts processing to add up the input image signal DVc and a signal written in the internal read RAM and write 2 it to the write RAM and goes to step ST18. At step ST18, the process performs the above-mentioned read accommodation processing and goes to step ST19.

At step ST19, the process decides whether the signal of one frame has been written completely to the write RAM. If, in this case, the signal of one frame is yet to be written completely, the process returns to step ST18 and, otherwise, returns to step ST15.

At step ST15, if the process decides frames have been added completely as many as the number of add frames FAD and goes to step ST20, the process performs second RAM switchover processing at step ST20. In the second RAM switchover, the process switches the write RAM and specifies any other unspecified RAM to the write RAM. Further, the process specifies the pre-switchover write RAM to an external read RAM. Furthermore, the process releases specification of the pre-switchover internal read RAM. Further, since the frames as many as the number of add frames FAD have been added completely, the process sets ON the external readability flag and returns to step ST12.

When the frames as many as the number of add frames have thus been added completely by switching the write RAM and internal read RAM while writing the signal, the process specifies the write RAM as the external read RAM and sets ON the external readability flag. Further, the process detects a state of the external readability flag during writing of the signal, to cause a signal indicating completion of addition of frames as many as the number of add frames FAD to be output at the variable frame rate FRc. Furthermore, the process "validates" the validity signal Tv for a frame of a signal read from the external read RAM.

FIGS. 12A-12G and FIGS. 13A-13E show operations in the case of generating such an image signal DVj that the variable frame rate FRc is, for example, "18P" and the output frame rate Fc is "60P". Of these, FIG. 12A shows the image signal DVb, FIG. 12B shows an operation of the RAM304-1, FIG. 12C shows that of the RAM304-2, FIG. 12D shows that of the RAM304-3, FIG. 12E shows the external readability flag, FIG. 12F shows the image signal DVj, and FIG. 12G shows the validity signal Tv.

If the variable frame rate FRc is "18P", based on FIG. 5, the number of add frames FAD is "3", the shooting frame rate FRp is "54P", which is three times the variable frame rate FRc, and the image signal DVb has a frame rate of "54P".

At time point t1 of FIGS. 12A-12G when frame "0f" of the image signal DVb starts, the shooting control unit 60, as shown in FIG. 13A, sets the movable terminal Pm of the signal selector 302 of the frame-addition-processing unit 30 to the side of the terminal Pa and also sets the movable terminal Pm of the signal selector 303 to the side the terminal Pa, to specify the RAM304-1 as a write RAM. In this case, an image signal of frame "0f" is supplied to the RAM304-1, which is the write RAM. Further, the shooting control unit 60 supplies the write control signal WT to the RAM304-1 so that the RAM304-1 may store the image signal of frame "0f".

Then, when an image signal of frame "1f" at time point t2 starts, the shooting control unit 60 sets the movable terminal Pm of the signal selector 305 to the side of the terminal Pa as shown in FIG. 13B. Further, it supplies the read control signal RT to the RAM304-1 to read the stored image signal of frame "0f". In this case, the adder 301 is supplied with the image signal DVb of frame "1f" and the image signal of frame "0f" read from the RAM304-1 as the image signal DVf. Therefore, the adder 301 adds the image signal of frame "0f" and that of frame "1f" to generate an added-up signal DVg. Further, the shooting control unit 60 switches the write RAM to set the movable terminal Pm of the signal selector 302 to the side of the terminal Pb and the movable terminal Pm of the signal selector 303 to the side of the terminal Pb, to specify the RAM304-2 as a write RAM and supply the added-up signal DVg to the RAM304-2. Further, the shooting control unit 60 supplies the RAM304-2 with the write control signal WT, thus causing the RAM304-3 to store the added DVg obtained as a result of adding up the image signals of frames "0f" and "1f".

When the image signal DVb of frame "2f" starts at time point t3, the shooting control unit 60, to generate a three-frame added-up signal, sets the movable terminal Pm of the signal selector 305 to the side of the terminal Pb connected to the RAM304-2 in which the added-up signal is stored, as shown in FIG. 13C. Further, it supplies the read control signal RT to the RAM304-2 to read the stored added-up signal for frames "0f" and "1f". In this case, the adder 301 is supplied with the image signal DVb of frame "2f" and an added-up signal read from the RAM304-2 as the mage signal DVf. Therefore, the adder 301 generates an added-up signal DVg obtained by adding up the image signals of frames "0f" through "2f". Further, the shooting control unit 60 switches the write RAM to set the movable terminal Pm of the signal selector 302 to the side of the terminal Pb and the movable terminal Pm of the signal selector 303 to the side of the terminal Pc, to specify the RAM304-3 as a write RAM and supply the added-up signal DVg to the RAM304-3. Furthermore, the shooting control unit 60 supplies the RAM304-1 with the write control signal WT, causing the RAM304-3 to store the added-up signal DVg for frames "0f" through "2f".

When the image signal DVb of frame "3f" starts at time point t4, the added-up signal for the number of add frames has been written to the RAM304-3 completely, so that the external readability flag is set ON as shown in FIG. 12E. Further, the RAM304-3 is specified as an external read RAM. Since the added-up signal for the number of add frames, that is, the added-up signal obtained by adding up the image signals DVb for the three frames has been generated completely, the shooting control unit 60, as shown in FIG. 13D, sets the movable terminal Pm of the signal selector 302 to the side of the terminal Pa and the movable terminal Pm of the signal selector 303 to the side of the terminal Pa. In this case, the image signal DVb of frame "3f" is supplied to the RAM304-1. Further, the shooting control unit 60 supplies the RAM304-1 with the write control signal WT, thereby causing the RAM304-1 to store the image signal of frame "3f".

Next, in a case where a timing comes to start a frame of the image signal DVj when an added-up signal for the number of add frames has been written completely to the RAM304, for example, in a case where a timing comes to start an output frame of the image signal DVj at time point t5 when the added-up signal DVg obtained by adding up the image signals of frames "0f" through "2f" has been written completely to the RAM304-3, the shooting control unit 60, as shown in FIG. 13E, sets the movable terminal Pm of the signal selector 306 to the side of the terminal Pc connected to the RAM304-3 specified as the external read RAM. Further, the shooting control unit 60 supplies the RAM304-3 with the read control signal RT to read the stored added-up signal obtained by adding up the image signals for the three frames and supply it as the image signal DVh to the output adjustment circuit 307.

The output adjustment circuit 307 adjusts a signal level of the image signal DVh on the basis of the control signal CTe from the shooting control unit 60. That is, since the image signal DVh is an added-up signal obtained by adding up the image signals for the three frames, it a multiplies the signal level of the image signal DVh by "⅓", thereby setting the image signal DVh to a signal having a predetermined level range. Furthermore, the validity signal Tv indicating a frame of an image having the variable frame rate is "validated" and, if it is no frame of an image having the variable frame rate, it is "invalidated" as shown in FIG. 12G. Note here that in FIGS. 14G and 15G also, if it is a frame of an image having the variable frame rate, the signal is shows as being "valid" and, otherwise, the signal is shown as being "invalid".

Similarly, the shooting control unit 60 can use the RAMs304-1 through 304-3 to generate an added-up signal by adding up three frames of the image signal DVb and read this added-up signal at a timing to start a frame of the image signal DVj, thereby generating an image signal having a predetermined output frame rate in which a shot image is contained at a variable frame rate.

Next, at time point t6 when a frame in which the signal has been read from the RAM304-3 ends, the external readability flag is set OFF. Note here that if a period in which no signal is read from the external read RAM, for example, a period from time point t6 to time point t7 is used as a blank frame without image, when an image is displayed on the basis of the image signal DVj, its brightness may flicker. Therefore, in a period "invalidated" by the validity signal Tv, an image of "validated" frames "(0f+1f+2f)/3" can be displayed repeatedly to prevent flickering of the brightness.

Furthermore, by employing the CDR system at the frame-addition-processing unit 30, it is possible to store a signal of a valid screen period in the RAM304 and read this stored signal at a frequency equal to that at the time of writing and, furthermore, adjust a blanking interval, thereby outputting such an image signal having an output frame rate that an image size in the valid screen period may be the same irrespective of the variable frame rate even if the supplied image signal DVb is not of the CDR system. Further, the frame-addition-processing unit 30 may adjust the signal level of the image signal DVb in accordance with the number of add frames previously, and then executes frame addition processing. In this case, a bit width of a signal, which is stored in the RAM or subject to the addition processing, is reduced, so that a configuration of the frame-addition-processing unit 30 can be simplified as compared to a case where the signal level of the image signal DVh is adjusted at the output adjustment circuit 307.

Note here that the variable frame rate FRc may vary during shooting in order to obtain special video effects. Operations for altering the variable frame rate during shooting will be described as follows.

The variable frame rate varies either in a case where image signals have been added up as described above or in a case where they have not. As shown in, for example, FIG. 5, to control the variable frame rate FRc into a range of "60P≧FRc>30P", it is unnecessary to perform frame addition processing, while to control the variable frame rate FRc into a range of not larger than "30P", frame addition processing is performed. Therefore, the shooting control unit 60 executes different processing, depending on whether the frame addition processing is performed or not.

FIGS. 14A-14G show a case where frame addition processing is not performed, for example, a case where the variable frame rate is altered from "60P" to "48P". In this case, the shooting control unit 60 switches the shooting frame rate FRp after a frame of the image signal DVb is completed. Further, the RAMs304-1 through 304-3 are sequentially used to store an image signal of one frame in each of these RAMs and, at a frame starting timing for the image signal DVj in a period when none of the stored signals is being read, those stored image signals are read at the variable frame rate FRc and output.

For example, when the output frame rate is altered from "48P" to "60P" by the frame rate setting signal PSF which is shown in FIG. 14A from input unit 61 at time point t11, the shooting control unit 60 controls the shooting unit 21 through the drive unit 62, to switch the shooting frame rate FRp at time point t12 when the frame of the image signal DVb is completed as shown in FIG. 14B. Further, the shooting control unit 60 stores each frame of the image signal DVb shown in this FIG. 14B in each of the RAMs304-1 through 304-3 sequentially as shown in FIGS. 14C, 14D, and 14E. Further, after the image signal of one frame is stored in each of the RAMs304, at frame starting timings for the image signal DVj, for example, at time points t21, t22, and t23 in a period when none of these stored signals is being read, the signal stored in each of the RAMs is read. Further, if the image signals stored in the RAMs304-1 through 304-3 are read already as shown at time point t24, their frames are invalidated by the validity signal Tv as shown in FIG. 14G, so that an image of a validated frame "8f" is used repeatedly. By performing the processing in such a manner, it is possible to obtain the image signal DVj having a desired output frame rate "60P" in which a shot image is contained at a variable frame rate "48P".

The following will describe a case where the frame addition processing is performed, with reference to FIGS. 15A-15G. FIGS. 15A-15G show a case where the variable frame rate FRc is altered, for example, from "31P" to "30P", "29P", and "28P" sequentially. In this case, the shooting control unit 60 is supposed to alter the shooting frame rate FRp and the number of add frames FAD after it has obtained an added-up signal obtained by adding up image signals as many as the number of add frames.

When, for example, the variable frame rate FRc is altered from "31P" to "30P" at time point t31 by the frame rate setting signal PSF shown in FIG. 15A from the input unit 61, the shooting control unit 60 controls the shooting unit 21 via the drive unit 62 to switch the shooting frame rate FRp at a moment when a frame of the image signal DVb is completed as shown in FIG. 15B. Note here that as shown in FIG. 5, the shooting frame rate FRp is "31P" when the variable frame rate FRc is "31P" and the shooting frame rate FRp is "60P" when the variable frame rate FRc is "30P". Therefore, the shooting control unit 60 switches the shooting frame rate FRp from "31P" to "60P" at time point t32 when the frame of the image signal DVb is completed. Further, the shooting control unit 60, as shown in FIG. 15C for example, causes the RAM304-1 to store the image signal DVb of frame "1f" at the time when the shooting frame rate FRp is "31P". Furthermore, since the variable frame rate FRc has been altered from "31P" to "30P", the number of add frames FAD is altered from "1" to "2". Therefore, the shooting control unit 60 controls operations of the frame-addition-processing unit 30 to add up the image signals DVb of two frames, thereby generating an added-up signal and outputting this added-up signal as the image signal DVj.

When the variable frame rate FRc is altered from "30P" to "29P" at time point t33, a frame of the corresponding image signal DVb is completed at time point t34. However, at time point t34, the processing of adding up the image signal of the two frames has not yet completed. Therefore, the shooting control unit 60 switches the shooting frame rate FRp from "60P" to "58P" when a frame next to the completely added up the image signal of two frames is completed, that is, at time point t35. In such a manner, after the frame adding-up processing is completed, the shooting frame rate FRp is altered, so that as shown in FIG. 15F, the image signal DVj becomes an image signal having a predetermined output frame in which a shot image having a variable frame rate set by the input unit 61 is contained. Further, the validity signal Tv becomes such as shown in FIG. 15G.

In such a manner, there is provided an shooting device that has the shooting unit for generating an image signal having an shooting frame rate from a shot image, the frame-addition-processing unit for adding up frames on the basis of an image signal generated by the shooting unit and outputting an image signal having a predetermined output frame rate in which the shot image is contained at the variable frame rate together with the validity signal indicating a frame of an image having the variable frame rate in the image signal having this output frame rate, and the shooting control unit for controlling operations of the shooting unit and the frame-addition-processing unit based on the frame rate setting signal and switching the number of add frames in varying of the shooting frame rate and/or adding of frames to set the variable frame rate to a frame rate based on the frame rate setting signal. Alternatively, an image signal having an shooting frame rate is generated from the shot image, based on which generated image signal frames are added up, so that an image signal having a predetermined output frame in which the shot image is contained at the variable frame rate is output together with the validity signal indicating a frame of the image having the variable frame rate in the image signal having this output frame rate, to switch the number of add frames in varying of the shooting frame rate and/or adding up of frames on the basis of the frame rate setting signal, thereby setting the variable frame rate to a frame rate based on the frame rate setting signal.

Therefore, if, as described later, a signal validated by the validity signal Tv is selected from among image signals obtained by shooting images at various variable frame rates and recorded at a recording frame rate in a recording medium, when reproducing this recording medium at a desired frame rate, a signal capable of providing a variable-speed playback image that matches the variable frame rate is recorded in the recording medium, so that without recording the image signal in a server etc. and then performing image processing, it is possible to simply confirm the special video effects speedily only by reproducing the signal recorded in the recording medium at a desired frame rate. Further, by selecting images validated by the validity signal and recording them, it is possible, for example, to use a server etc. not having a large recording capacity.

That is, to easily obtain special video effects such as high-speed playback or slow-motion playback, it is possible to shoot images at, for example, a frame rate lower than a predetermined one by using a conventional shooting device that can vary a frame rate during shooting and reproduce them at the predetermined frame rate, thereby easily obtaining a high-speed playback image. By shooting images at a higher frame rate and reproducing them at the predetermined frame rate, on the other hand, a slow-motion playback image can be obtained easily. Note here that in a case where an image signal output from the conventional shooting device is recorded, if a recording frame rate of the recording device is constant, an image signal is generated in such a manner that valid picture frames as many as a number that corresponds to an shooting frame rate when shooting may be contained in the image signal having this recording frame rate. Therefore, if an image signal output from the shooting device is recorded at a recording frame rate, it is impossible to efficiently record only a signal having a required valid picture frame rate. However, efficient recording is possible by selecting images validated by the validity signal output from the shooting device 10 of the present embodiment and recording these images.

Furthermore, the shooting control unit in the shooting device generates additional information relevant to images each having the variable frame rate and outputs it together with an image signal having a predetermined output frame rate. Alternatively, it generates additional information relevant to images each having the variable frame rate and outputs it together with an image signal having a predetermined output frame rate so that shooting conditions etc. can be confirmed easily on the basis of this additional information. Further, the shooting control unit controls the shooting unit to generate a shoot signal of the common data rate (CDR) system. Alternatively, it can generate a shoot signal of the CDR system as an image signal to keep constant an image size during a valid screen period even when the variable frame rate is changed.

Figure 16:
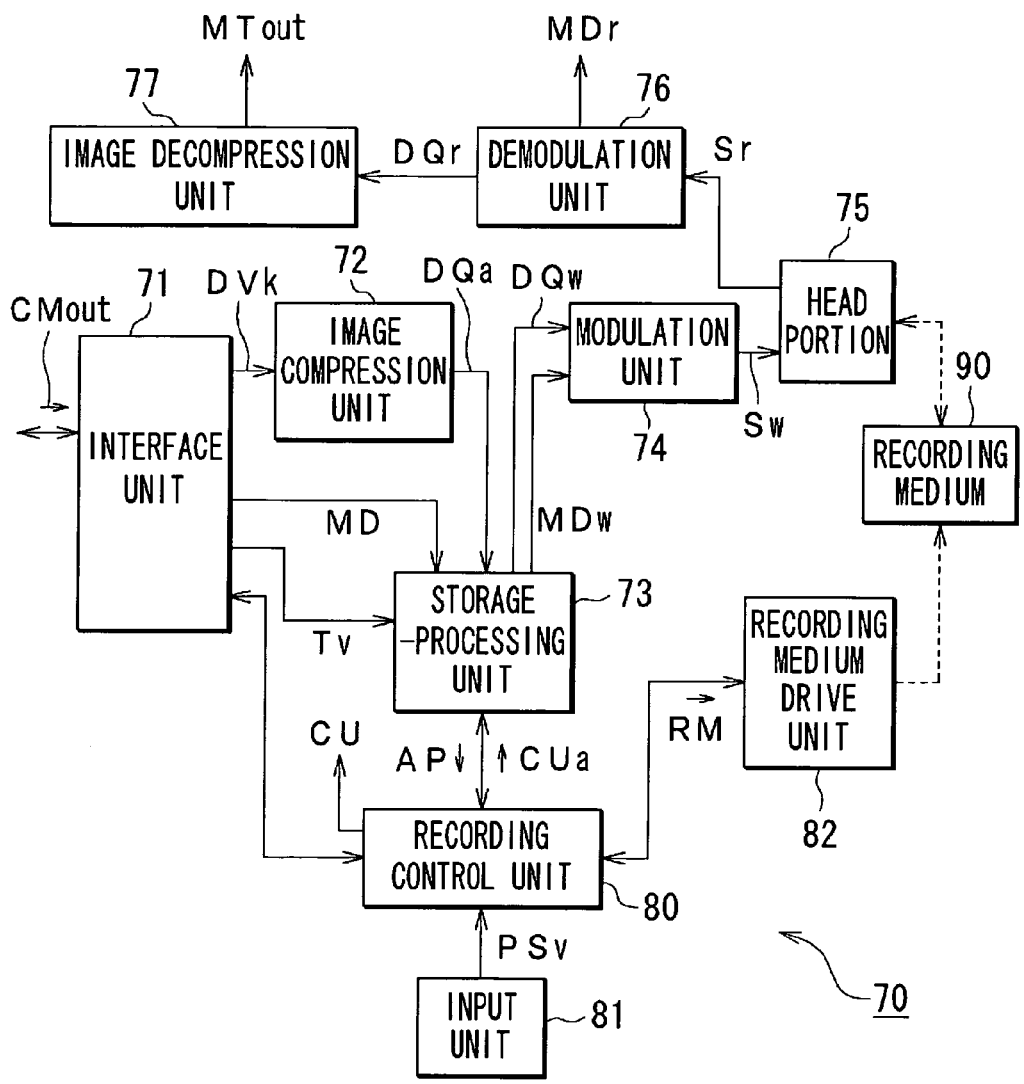
FIG. 16 is a diagram for showing a configuration of a signal-recording device.

Next, a configuration of the signal-recording device 70 is shown in FIG. 16. Note here that FIG. 16 shows it together with a demodulation unit and an image decompression unit to be used in a reproduction to later-describe an operation of reproducing a signal recorded in the recording medium.

The signal CMout output from the shooting device 10 is supplied to the interface unit 71 in the signal-recording device 70. The interface unit 71 separates the image signal DVk, the additional information MD, and the validity signal Tv from the signal CMout and supplies the image signal DVk to an image compression unit 72. Further, it supplies the additional information MD and the validity signal Tv to a storage-processing unit 73.

The image compression unit 72 performs compression processing to reduce a signal quantity of the image signal DVk. In this compression processing, as described later, a signal of a frame validated by the validity signal Tv is selected to perform intra-frame predictive encoding, thereby generating an encoded signal DQa. This generated encoded signal DQa is supplied to the storage-processing unit1111 73.

The storage-processing unit 73 selects an encoded signal DQw of an image validated by the validity signal Tv from among the encoded signals DQa and stores it. Further, it stores the additional information MDw relevant to a stored image. Further, it reads the stored encoded signal DQw and additional information MDw and supplies them to a modulation unit 74.

Figure 17:
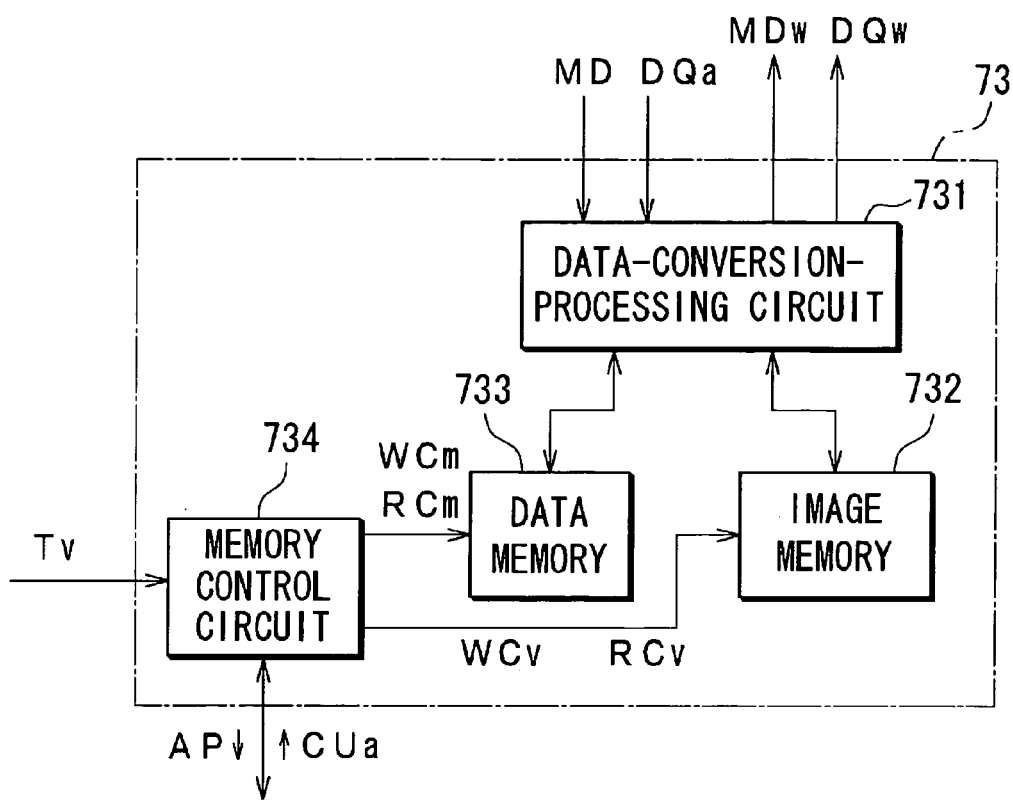
FIG. 17 is a diagram for showing a configuration of a storage-processing unit.

FIG. 17 is a diagram for showing a configuration of the storage-processing unit 73. To a data-conversion-processing circuit 731, an image memory 732 for storing the encoded signal DQW and a data memory 733 for storing the additional information MDw are connected. Further, to the image memory 732 and the data memory 733, a memory control circuit 734 for controlling signal write/read operations is connected.

The data-conversion-processing circuit 731 converts the encoded signal DQw into a signal ME in a format that matches the image memory 732 and supplies it to the image memory 732. In this case, the encoded signal DQw obtained through compression processing has a different signal quantity with different image contents and the signal quantity of the signal ME varies with each frame, so that when this signal ME is written to the image memory 732, it is impossible to easily read the signal ME for each frame image. Therefore, to enable the signal ME to be easily read for each frame image unit from the image memory 732, the data-conversion-processing circuit 731 equalizes a signal quantity of the signal ME for each frame. That is, the image compression portion 72 performs compression processing so that the signal quantity of the encoded signal DQa for each frame may not exceed a preset signal quantity. Further, if the signal quantity of the signal ME is less than that when the signal ME is generated on the basis of the encoded signal DQw having a preset signal quantity, the data conversion processing circuit 731 utilizes, for example, an invalid signal and writes it to the image memory 732 as a signal ME having a constant signal quantity.

Further, the data-conversion-processing circuit 731 removes from the signal ME read from the image memory 732 an invalid signal added to make the signal ME have a constant signal quantity and recovers it to a signal DQw having an original format and supplies it to the modulation unit 74 shown in FIG. 16. Similarly, it converts the additional information MDw into the signal MF having a format that matches the data memory 733 and supplies it to the data memory 733. Further, it recovers the signal MF read from the data memory 733 to the additional information MDw having an original format and supplies it to the modulation unit 74 shown in FIG. 16.

The memory control circuit 734 generates write control signals WCv and WCm and read control signals RCv and RCm on the basis of the validity signal Tv supplied from the interface unit 71 and a control signal CUa supplied from a recording control unit 80. It supplies these write control signal WCv and read control signal RCv to the image memory 732 to write to the image memory 732 the signal ME on the basis of an image validated by the validity signal Tv. Further, it reads the written signal ME in an order they have been written when a quantity of signals stored in the image memory 732, that is, a signal quantity of signals that have been written in the image memory 732 but has not yet read reaches a predetermined level.

Furthermore, it supplies the write control signal WCm and the read control signal RCm to the data memory 733 to write to the data memory 733 a signal MF of the additional information MDw that corresponds to a frame image written to the image memory 732. To read the signal MF from the image memory 732, the signal MF of the additional information MDw that corresponds to a signal of a frame image is read.

Further in the memory control circuit 734, as information that indicates a quantity of signals stored in the image memory 732, phase difference information AP indicating a difference in phase between a write position and a read position for the signal on, for example, the image memory 732 is supplied to the recording control portion 80. This phase difference indicates an address distance between the write position and the read position or the number of frames between them.

The modulation unit 74 shown in FIG. 16 adds an error correcting code to the encoded signal DQw and the additional information MDw and performs channel coding that matches the recording medium to generate a recording signal Sw having a predetermined recording format and supply it to a head portion 75. Based on this recording signal Sw, it drives the head portion 75 to record the shot image and the additional information in the recording medium 90 at a predetermined recording frame rate. Note here that as the head portion 75, such a head portion as to match the recording medium 90 is used. For example, to use a magnetic tape as the recording medium or an optical disc, a magnetic head or an optical pickup is used respectively.

A reproduction signal Sr obtained by reproducing the recording medium 90 at the head portion 75 is supplied to a demodulation unit 76. The demodulation unit 76 performs demodulation processing or error correcting processing on the reproduction signal Sr to supply an obtained encoded signal DQr to an image compression unit 77. Further, it outputs additional information MDr obtained at the modulation unit 76 from the signal-recording device 70. The image decompression portion 77 performs decompression processing on the encoded signal DQr to generate the image signal MTout and supply it to the image display device 110. Note here that the image compression unit 72 and the image decompression unit 77 are provided to efficiently record the image signal DVk in the recording medium 90 and are not always necessary to constitute the signal-recording device 70.

To the recording control unit 80, an input unit 81 is connected, so that a signal in accordance with user operations or a signal from a remote controller or an external apparatus etc. is supplied as an operation signal Psv through the input unit 61 to the shooting control unit 60. The recording control unit 80 generates a control signal CU etc. on the basis of the operation signal PSv to control operations of the various units, thereby causing the signal-recording device to operate in accordance with the user operations or a signal from the remote controller or the external apparatus etc.

Further, in a case where an operation mode of the signal-recording device 70 is a variable-frame-rate-recording mode, when a phase difference is detected to have reached a recording start level on the basis of the phase difference information AP supplied from the recording-processing unit, a control signal RM is supplied to a recording medium drive unit 82, thereby causing the recording medium drive unit 82 to drive the recording medium 90. Further, it controls operations of the storage-processing unit 73 using the control signal CUa, thereby causing the signals ME stored in the image memory 732 to be read in an order they have been written and supplied to the modulation unit 74. Further, it reads from the data memory 733 the signal MF of additional information relevant to the signal ME of a read frame image and supplies it to the modulation unit 74. Furthermore, when the phase difference is lowered to a recording stop level on the basis of the phase difference information AP, it stops reading of signals from the image memory 732 and the data memory 733 as well as recording of signals to the recording medium 90. Then, when a signal quantity of the signals recorded in the image memory 732 has reached a recording start level, it starts recording signals to the recording medium 90 again. Similarly, in a variable frame rate recording mode, it records images intermittently to the recording medium 90 according to a quantity of the signals recorded in the image memory 732.

When the operation mode of the signal-recording device 70 is switched from the variable frame rate recording mode to the stop mode on the basis of the operation signal PSv, the recording control unit 80 stops writing signals at the storage-processing unit 73 and reads signals stored in the storage-processing unit 73 and records these signals to the recording medium 90 and then ends the recording operation.

Further, the shooting device 10 and the signal-recording device 70 are not limited to such one that can be controlled each in operation on the basis of the operation signal from the input unit 61 or 81. For example, the shooting control unit 60 in the shooting device 10 and the recording control unit 80 in the signal-recording device 70 may communicate with each other through the interface unit to control operations of the other devices on the basis of the operation signal supplied from the input unit 61 in the shooting device 10 to the shooting control unit 60 or that supplied from the input unit 81 in the signal-recording device 70 to the recording control unit 80. In this case, the shooting device 10 and the signal-recording device 70 need not each be operated but only one of them can be operated to perform recording, reproduction, etc. of shot images.

Figure 18:
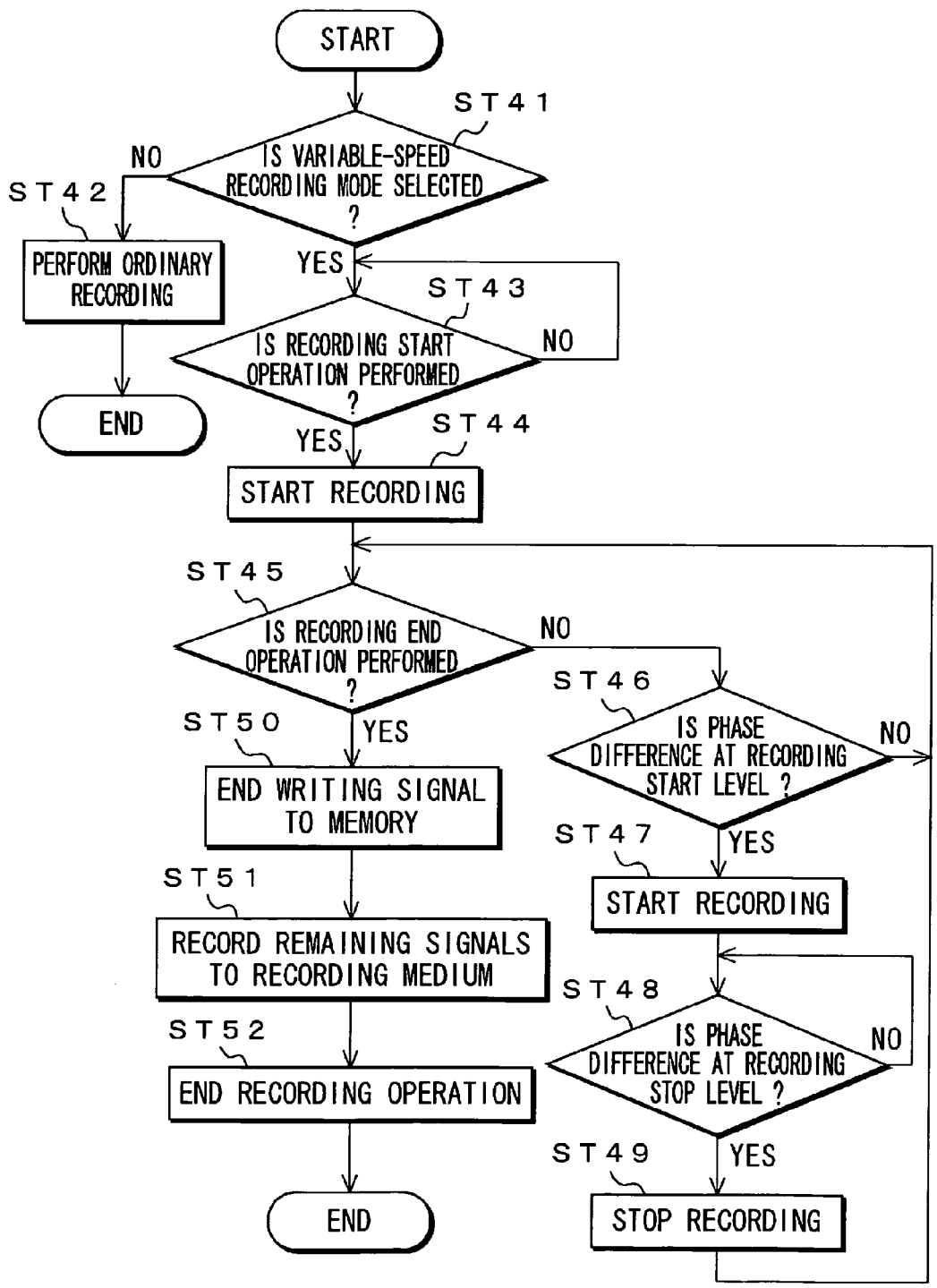
FIG. 18 is a flowchart for showing a signal-recording operation.

The following will describe a signal-recording operation with reference to a flowchart of FIG. 18. At step ST41, the process decides whether the variable recording mode is selected. If the variable recording mode is not selected by using the operation signal PSv from the input unit 81, the process goes to step ST42 to perform an ordinary recording operation, that is, the shooting device 10 makes the shooting frame rate constant and avoids frame addition, to generate image signals each having an output frame rate. The signal-recording device 70 sequentially records the image signals each having the output frame rate to the recording medium at a recording frame rate equivalent to the output frame rate. Further, if the variable recording mode is selected, the process goes to step ST43.

At step ST43, the process decides whether a recording start operation is performed based on the operation signal PSv from the input unit 81. If the recording start operation is not performed, the process returns to step ST43 and, otherwise, goes to step ST44.

At step ST44, the process starts the recording operation. That is, the process sequentially stores signals of frame images validated by the validity signal Tv to the recording-processing unit 73 and goes to step ST45. For example, the process selects an image signal of an image having a variable frame rate "18P" validated by the validity signal Tv shown in FIG. 12G from the image signals DVj having an output frame rate "60P" shown in FIG. 12F and stores it in the storage-processing unit 73.

At step ST45, the process decides whether a recording end operation is performed on the basis of the operation signal PSv. If the recording end operation is not performed, the process goes to step ST46 and, otherwise, goes to step ST50.

At step ST46, the process decides whether a phase difference between a write position and a read position of the signal ME on the image memory 732 is increased to a recording start level "Lws (frame)". If the phase difference has not yet increased to the recording start level "Lws", the process returns to step ST45. Otherwise, the process goes to step ST47.

At step ST47, the process starts an operation of recording an image or additional information to the recording medium 90. For example, when the recording medium 90 is driven to enable the recording signal Sw to be recorded to the recording medium 90, the process reads the signals ME and MF recorded in the recording processing unit 73 to generate the recording signal Sw and supply this recording signal Sw to the head portion 75 to record the shot image or the additional information to the recording medium 90.

At step ST48, the process decides whether the phase difference between the write position and the read position is lowered to a recording stop level "Lwe (frame)". If the phase difference is yet to be lowered to the recording stop level "Lwe", the process returns to step ST48. Otherwise, the process goes to step ST49.

At step ST49, the process stops recording the shot image and the additional information to the recording medium. For example, the process suspends reading the signals ME and MF stored in the storage-processing unit 73 and stops generation of the recording signal Sw. Further, when a recording medium not capable of random access such as a magnetic tape is used, the process stops driving the recording medium 90 and returns to step ST45.

Then, the process ends the recording and goes from step ST45 to step ST50, where the process ends writing of the signals to the image memory 732 and the data memory 733 and goes to step ST51.

At step ST51, the process records the signals left in the recording-processing unit 73 to the recording medium 90 to record all the signals written in the memory of the storage-processing unit 73 to the recording medium 90 and then goes to step ST52. At step ST52, the process ends the recording operation. That is, the process ends the signal-reading operation at the storage processing unit 73 and ends driving of the recording medium 90, to end the recording operation in the variable recording mode.

FIGS. 19A-19B show write/read operations for signal performed to the image memory 732; in FIG. 19A a solid line indicates a write position for a signal and a broken line indicates a read position for a signal. As shown in the figure, signals are written and read in a cyclic manner, that is, if the write or read position is at a final address, the signal is written or read respectively from a start address again. FIG. 19B, on the other hand, shows a phase difference between the write position and the read position.

When recording starts at time point t41, writing of the signal ME to the image memory 732 starts, so that the phase difference increases as time elapses. In this case, if the variable frame rate FRc is small in value, a small number of frames of an image are written to the image memory 732, so that a gradient of the line that indicates the signal write position decreases.

If the write position increases in phase until the phase difference reaches the recording start level "Lws" at time point t42, the recording control unit 80 starts driving the recording medium 90. Then, at time point t43 when it is enabled the recording signal Sw to be recorded to the recording medium 90, the process sequentially reads the stored signals ME and MF from the image memory 732 to generate the recording signal Sw and record it to the recording medium 90 at a predetermined recording frame rate. In this case, the phase difference decreases if a write operation is faster than a read operation to the image memory 732 as in a case where, for example, the variable frame rate is "18P" and the recording frame rate is "60P".

Then, if the phase difference decreases to the recording stop level "Lwe" at time point t44, the process stops reading of the signals and stops recording of the signals to the recording medium 90. Further, if the phase difference increases due to stopping of the signal read operation until it reaches the recording start level "Lws" at time point t45, the process restarts driving the recording medium 90 to start reading a signal at time point t46 when it is enabled signals to be recorded to the recording medium 90. Similarly, the process records the signals intermittently to the recording medium 90 in accordance with the phase difference between the write position and the read position for signal.

By thus recording the signals to the recording medium 90 intermittently, it is possible to sequentially record signals of frame images for each frame properly with some signals to be recorded being present always in the recording medium during the signal recording even if the variable frame rate ERc is smaller than the recording frame rate.

Then, when the recording end operation is performed at time point t51, the process stops writing the signals to the image memory 732. Further, since signals as much as a phase difference are left in the image memory 732 yet to be unrecorded to the recording medium 90, the process reads these remaining signals and records them to the recording medium 90. Then, when the phase difference is reduced to zero at time point t52, the process ends reading the signals from the image memory 732, ends driving of the recording medium 90, records the images up to a moment when the recording end operation is performed to the recording medium, and ends the recording operation.

In such a manner, the signal-recording device 70 uses an image signal having a predetermined output frame rate in which a shot image is contained at a variable frame rate, to record this shot image having the variable frame rate to the recording medium 90 at a recording frame rate.

Further, although in this embodiment, to easily perform signal write and read operations to the image memory 732 for each frame image, the signal ME has been written to the image memory 732 after its signal quantity based on an encoded signal DQ is made equal for each frame, by managing a signal storage position for each frame image, the signal can be written and read for each frame image without equalizing the signal quantity of the signal ME for each frame.

For example, by managing the write starting position and write ending position for signal for each frame image, to read signals from the image memory 732, a signal of a desired frame image can be read on the basis of these starting position and ending position. In this case, since the signal quantity of each frame image varies with contents of the image, by setting speeds of signal writing and reading operations to the image memory 732 on the basis of the signal of a frame image having the largest signal quantity, it is possible to properly write and read the signal for each frame image even if the signal quantity fluctuates.

The following will describe display operations for displaying the reproduced image at the image display device 110 by reproducing the data from the recording medium 90 in which the shot image of variable frame rate is recorded at the recording frame rate.

FIG. 20 explains a reproduction operation in the case of reproducing at frame rate "24P" the recording medium 90 in which an image indicated to be valid by the validity signal Tv is recorded at, for example, frame rate "60P".

In a period from time point t61 to time point t62 during the image is reproduced, which has been shot at a set value of variable frame rate "18P", in the image signal MTout obtained by reproducing the recording medium 90, an image shot at variable frame rate "18P" is displayed at a multiplied-by-"24/18 ($\approx$1.33)" speed with respect to the shot speed. Therefore, the image is displayed at the image display device 110 at a high playback speed of about 1.33 times the shot speed. Further, in a period from time point t62 to time point t63 during the image is reproduced, which has been shot at a set value of variable frame rate "24P", the reproduction frame rate and the variable frame rate are equal to each other, so that the image is reproduced at a multiplied-by-1 speed with respect to the shot speed. In a period from time point t63 to time point t64 during the image is reproduced, which has been shot at a set value of variable frame rate "48P", the image shot at variable frame rate "48P" is displayed at a multiplied-by-"24/48(=½)" speed with respect to the shot speed. Therefore, the displayed image is reproduced slowly at half the shot speed. Further, additional information is recorded in the recording medium 90 together with the images, so that it is possible to easily know on the basis of the additional information MDr on which shooting conditions each of frame images of the variable-speed playback images has been shot, etc.

If, in such a manner, a signal validated by the validity signal Tv is selected from among image signals obtained through shooting at various variable frame rates and recorded to the recording medium 90 at a recording frame rate, when contents of this recording medium 90 are reproduced at a desired frame rate, a signal capable of obtaining a variable-speed playback image that matches the variable frame rate is recorded to the recording medium 90. Therefore, only by reproducing at a desired frame rate a signal recorded in the recording medium 90, special video effects can be confirmed easily and speedily without recording the image signal in a server etc. and processing images.

Further, an image validated by the validity signal Tv is selected and recorded, so that only a variable-speed playback image is recorded in the recording medium 90. Therefore, it is unnecessary to record all of image signals having a shooting frame rate conventionally, so that, for example, a server etc. not having a large recording capacity can be used.

PROBABILITY OF UTILIZED INDUSTRIALIZATION

As described above, according to a shot-image-recording system and a signal-recording device and method related to the present invention, signal recording is executed using an image signal having a predetermined output frame rate in which images each having a variable frame rate are contained and a validity signal indicating frames of the images having the variable frame rate with respect to this image signal; on the basis of this validity signal, image signals of the images having the variable frame rate are selected from among the image signals and stored in storage means, so that in accordance with a signal quantity of the image signals stored in the storage means, the signals stored in the storage means are intermittently recorded to a recording medium at a predetermined recording frame rate. Therefore, to obtain special video effects, fewer image signals of shot images are required to be recorded and these special video effects can be conformed speedily and properly, so that the present invention is useful in production of a movie and a TV program and well applicable especially in obtaining special video effects.

The invention claimed is:

1. A shot-image-recording system comprising:
a shooting device for shooting an object; and
a signal-recording device for recording in a recording medium an image signal obtained by shooting the object with the shooting device,
wherein said shooting device comprises:
shooting means for generating from a shot image a first image signal having a shooting frame rate;
frame-addition-processing means for adding one or more frames to the first image signal generated by the shooting means to obtain a second image signal having an output frame rate in which the shot image is contained at a variable frame rate and outputting said second image signal having the output frame rate and a validity signal indicating a frame of the first image signal having the variable frame rate in said second image signal having the output frame rate; and
shooting control means for controlling operations of the shooting means and the frame-addition-processing means on the basis of a frame-rate-setting signal, to vary the shooting frame rate and/or vary the number of frames to be added to the first image signal so that the variable frame rate may be set to a frame rate based on the frame-rate-setting signal, and
wherein the signal-recording device comprises:
storage means for storing the second image signal temporarily;
storage control means for selecting an image signal of the image having the variable frame rate from among the second image signal having the output frame rate on the basis of said validity signal and storing it in the storage means;
recording means for recording a signal in the recording medium; and
recording control means for recording the second image signal stored in the storage means in the recording medium intermittently at a predetermined recording frame rate in accordance with a signal quantity of the second image signal stored in the storage means.

2. The shot-image-recording system according to claim 1, wherein the recording control means uses a phase difference between a write position and a read position for the signal as the signal quantity of the image signal stored in the storage means.

3. The shot-image-recording system according to claim 1, wherein the signal-recording device further comprises image compression means;
wherein the image compression means compresses the image signal of the image having the variable frame rate; and
wherein the storage control means stores the compressed image signal in the storage means.

4. The shot-image-recording system according to claim 1, wherein the shooting control means generates additional information relevant to the image having the variable frame rate; and
wherein the storage control means stores the image signal of the image having the variable frame rate and the additional information in the storage means.

5. The shot-image-recording system according to claim 1, wherein the image signal having the output frame rate is a signal of a common data rate (CDR) system.

6. A signal-recording device for recording a signal using an image signal having an output frame rate in which an image having a variable frame rate is contained and a validity signal indicating a frame of the image having the variable frame rate with respect to the image signal, comprising:
storage means for storing the image signal temporarily;
storage control means for selecting the image signal of the image having the variable frame rate from among the image signal on the basis of the validity signal and storing it in the storage means;
recording means for recording the image signal in the recording medium; and
recording control means for recording the image signal stored in the storage means in the recording medium intermittently at a predetermined recording frame rate in accordance with a signal quantity of the image signal stored in the storage means.

7. The signal-recording device according to claim 6, wherein the recording control means uses a phase difference between a write position and a read position for the signal as the signal quantity of the image signals stored in the storage means.

8. The signal-recording device according to claim 6, further comprising image compression means,
wherein the image compression means compresses the image signal of the image having the variable frame rate; and
wherein the storage control means stores the compressed image signal in the storage means.

9. The signal-recording device according to claim 6, wherein the image signal having the predetermined output frame rate is a signal of a common data rate (CDR) system.

10. A signal-recording method for recording a signal using an image signal having an output frame rate in which an image having a variable frame rate is contained and a validity signal indicating a frame of the image having the variable frame rate with respect to this image signal, said method comprising the steps of:
selecting the image signal of the image having the variable frame rate from among the image signal on the basis of the validity signal and storing it in the storage means; and
recording the image signal stored in the storage means in the recording medium intermittently at a predetermined recording frame rate in accordance with a signal quantity of the image signal stored in the storage means.

11. The signal-recording method according to claim 10, wherein a phase difference between a write position and a read position for the signal is used as the signal quantity of the stored image signal.

12. The signal-recording method according to claim 10, further comprising the step of compressing the image signal of the image having the variable frame rate, and storing the compressed image signal in the storage means.

13. The signal-recording method according to claim 10, wherein the image signal having the output frame rate is a signal of a common data rate (CDR) system.

* * * * *